United States Patent
Ariga

(10) Patent No.: US 11,574,038 B2
(45) Date of Patent: Feb. 7, 2023

(54) MICROSCOPE SYSTEM, ACCESS-CONTROL ASSISTANCE METHOD, AND COMPUTER READABLE MEDIUM

(71) Applicant: Evident Corporation, Tatsuno-machi (JP)

(72) Inventor: Naohiro Ariga, Tokyo (JP)

(73) Assignee: Evident Corporation, Nagano (JP)

( * ) Notice: Subject to any disclaimer, the term of this patent is extended or adjusted under 35 U.S.C. 154(b) by 214 days.

(21) Appl. No.: 16/748,114

(22) Filed: Jan. 21, 2020

(65) Prior Publication Data
US 2020/0233948 A1 Jul. 23, 2020

(30) Foreign Application Priority Data
Jan. 23, 2019 (JP) .............................. JP2019-009281

(51) Int. Cl.
| | | |
|---|---|---|
| G06F 21/35 | (2013.01) | |
| G02B 21/36 | (2006.01) | |
| H04N 5/232 | (2006.01) | |
| H04L 9/32 | (2006.01) | |
| H04N 21/214 | (2011.01) | |
| H04N 21/232 | (2011.01) | |

(52) U.S. Cl.
CPC ........... *G06F 21/35* (2013.01); *G02B 21/365* (2013.01); *H04L 9/32* (2013.01); *H04N 5/23203* (2013.01); *H04N 21/2143* (2013.01); *H04N 21/232* (2013.01)

(58) Field of Classification Search
CPC ....... G06F 21/35; G06F 21/31; G02B 21/365; H04N 5/23203
See application file for complete search history.

(56) References Cited

U.S. PATENT DOCUMENTS

| | | | | |
|---|---|---|---|---|
| 7,292,251 | B1 * | 11/2007 | Gu | G06T 9/00 |
| | | | | 382/128 |
| 2008/0246839 | A1 | 10/2008 | Hattori et al. | |
| 2015/0130923 | A1 | 5/2015 | Kobayashi et al. | |
| 2019/0206003 | A1 * | 7/2019 | Harris | G16H 40/40 |
| 2019/0378610 | A1 * | 12/2019 | Barral | G09B 19/24 |
| 2020/0041780 | A1 * | 2/2020 | Na'Aman | G02B 21/0072 |
| 2020/0218817 | A1 * | 7/2020 | Thrower | G06F 21/35 |
| 2021/0029298 | A1 * | 1/2021 | Mysore | G08B 13/19669 |

FOREIGN PATENT DOCUMENTS

| | | |
|---|---|---|
| JP | 2008257065 A | 10/2008 |
| JP | 2014168395 A | 9/2014 |
| JP | 2015094855 A | 5/2015 |
| JP | 2015220650 A | 12/2015 |
| JP | 2016109636 A | 6/2016 |
| WO | 2018087819 A1 | 5/2018 |

OTHER PUBLICATIONS

Japanese Office Action dated Aug. 23, 2022, (and English translation thereof) issued in counterpart Japanese Application No. 2019-009281.

* cited by examiner

*Primary Examiner* — Richard T Torrente
(74) *Attorney, Agent, or Firm* — Holtz, Holtz & Volek PC

(57) ABSTRACT

A microscope system includes a microscope that acquires a microscopic image and circuitry. The circuitry causes the microscope to perform a series of image-shooting operations for acquiring a plurality of microscopic images and outputs an access code generated in response to the start of the series of image-shooting operations, the access code being used to access image-shooting information pertaining to the series of image-shooting operations.

18 Claims, 24 Drawing Sheets

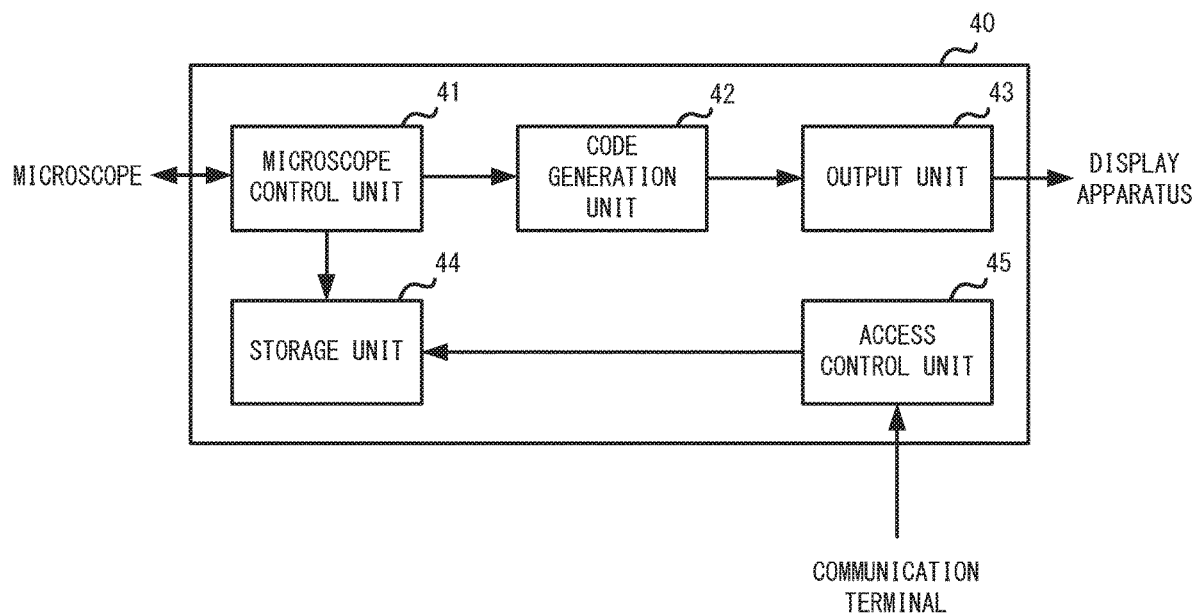
F I G. 3

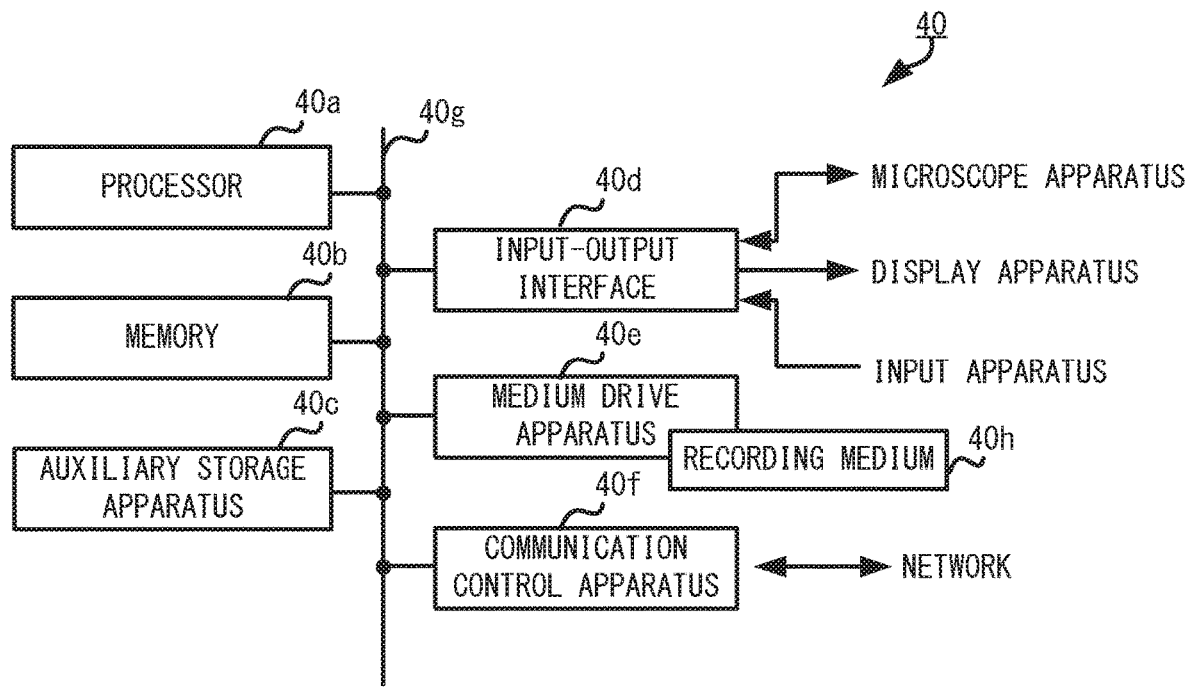
F I G. 4

| ACCESS CODE DETAILS | STORAGE LOCATION FOR IMAGE-SHOOTING INFORMATION |
|---|---|
| &9-wOZLofjNJV?V | D:¥¥timelapse¥20180101¥09001234 |
| 9m}zt7&ax;%j7>2 | D:¥¥timelapse¥20180101¥12005678 |
| }wvjZ36~EjHDXcf | D:¥¥timelapse¥20180101¥12451234 |
| -2*E2p\|_<Y7j2sU | D:¥¥timelapse¥20180101¥15155678 |
| }j&X!#uZ(a!SE.& | D:¥¥timelapse¥20180102¥11001234 |

F I G. 6

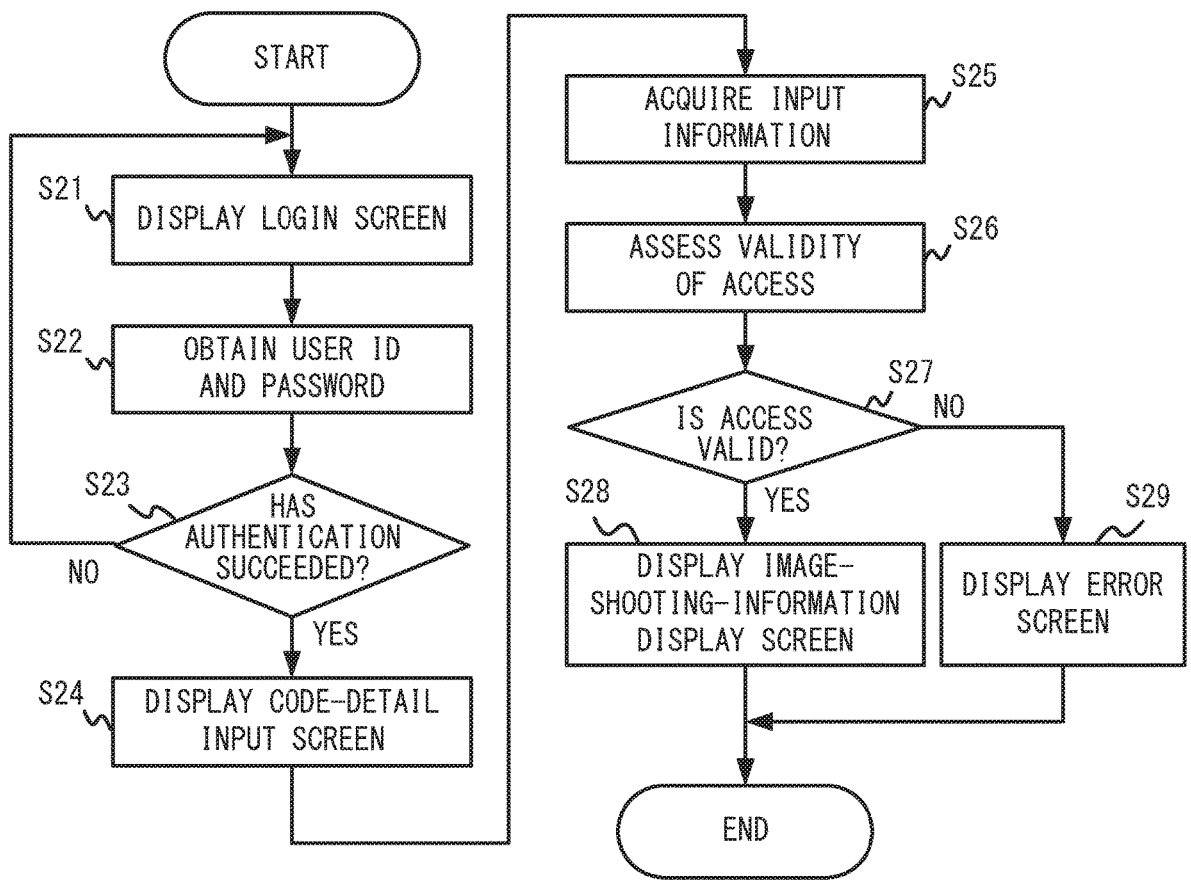
F I G. 12

I2

| ACCESS CODE DETAILS | STORAGE LOCATION FOR IMAGE-SHOOTING INFORMATION | USER ID |
|---|---|---|
| &9-wOZLofjNJV?V | D:¥¥timelapse¥20180101¥09001234 | 98123456 |
| 9m}zt7&ax;%j7>2 | D:¥¥timelapse¥20180101¥12005678 | 01987655 |
| }wvjZ36~EjHDXcf | D:¥¥timelapse¥20180101¥12451234 | 02567891 |
| -2*E2p\|_<Y7j2sU | D:¥¥timelapse¥20180101¥15155678 | 08257901 |
| }j&X!#uZ(a!SE.& | D:¥¥timelapse¥20180102¥11001234 | 10975313 |

| USER ID | TERMINAL ID |
|---|---|
| 98123456 | AAAAAAAA |
| 01987655 | BBBBBBBB |
| 02567891 | CCCCCCCC |
| 08257901 | DDDDDDDD |
| 10975313 | EEEEEEEE |

FIG. 15

| MICROSCOPE | EXCLUSION FLAG |
|---|---|
| MICROSCOPE 1 O | ✓ |
| MICROSCOPE 2 O | |
| MICROSCOPE 3 O | |
| ⋮ | |
| ⋮ | |

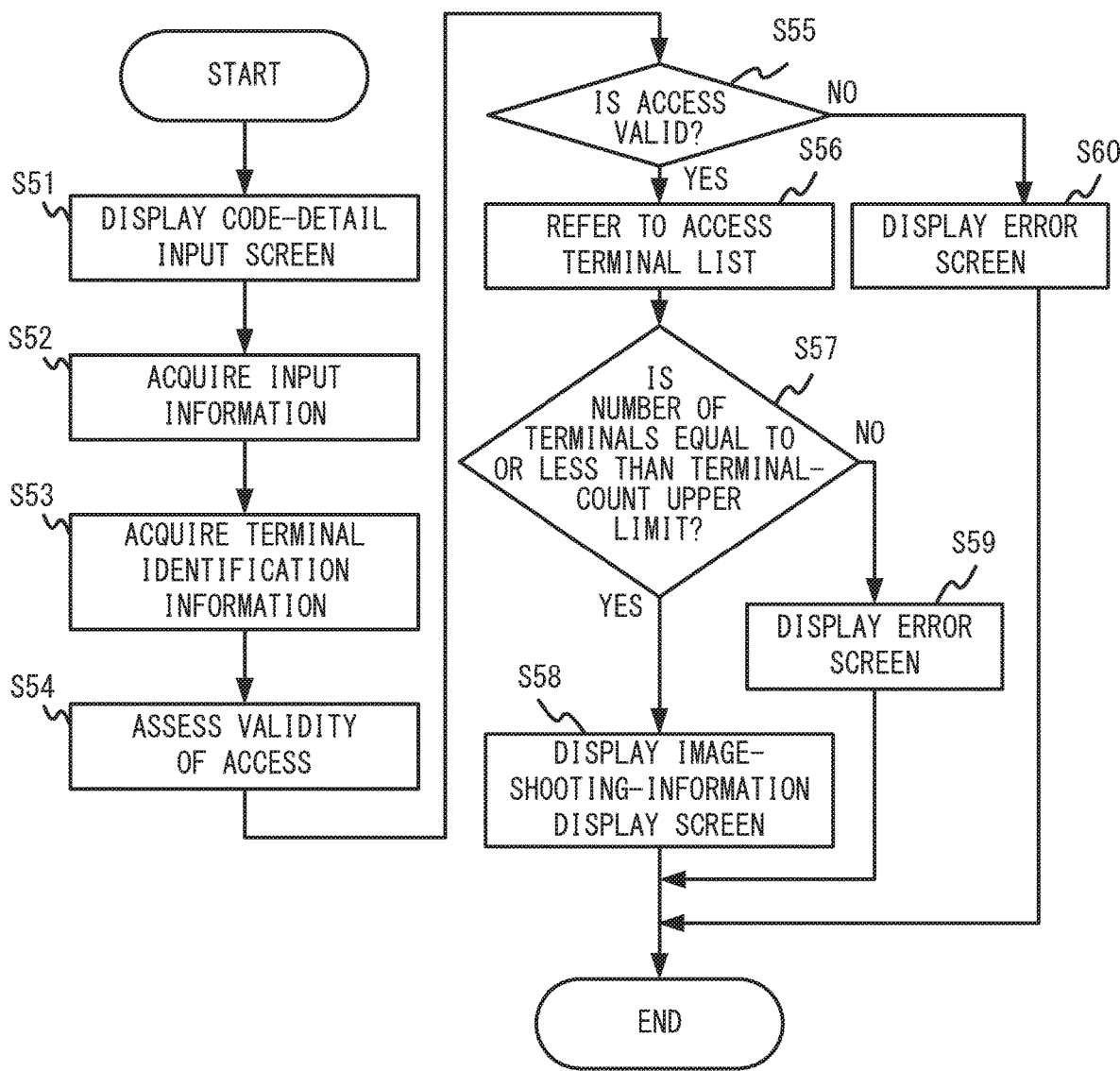
F I G. 2 0

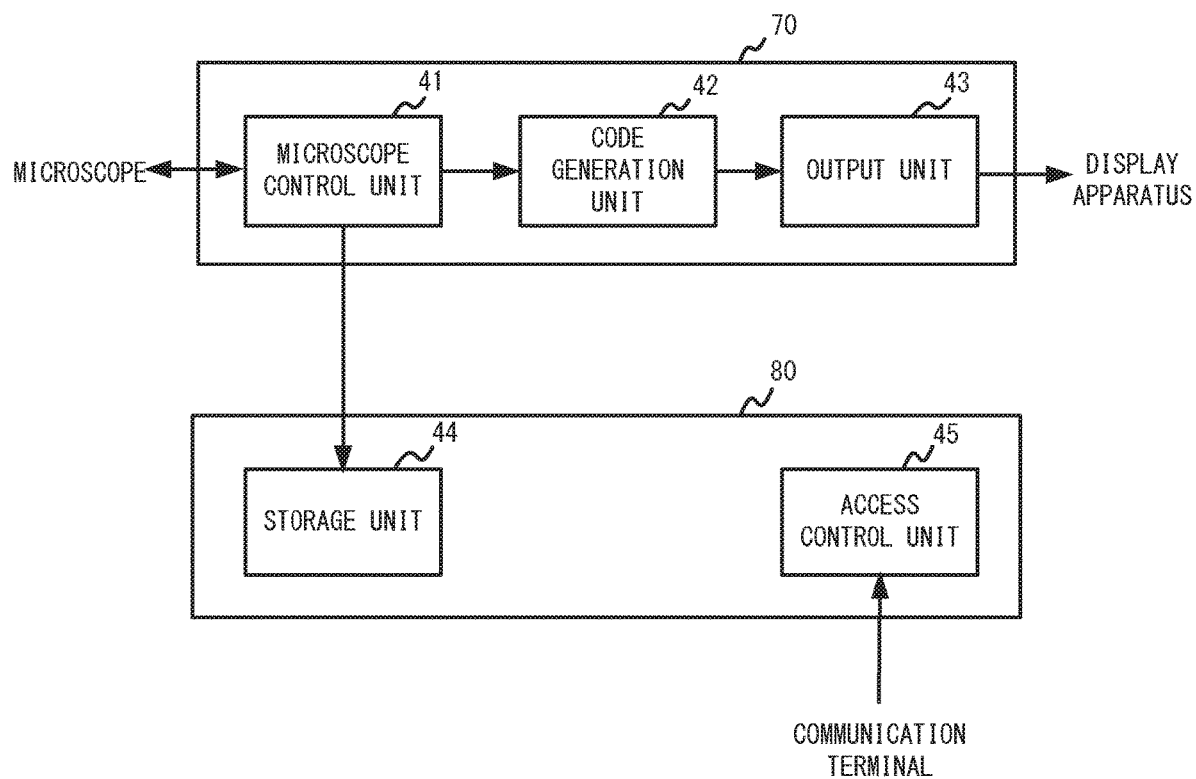
F I G. 2 3

MICROSCOPE SYSTEM, ACCESS-CONTROL ASSISTANCE METHOD, AND COMPUTER READABLE MEDIUM

CROSS REFERENCE TO RELATED APPLICATIONS

This application is based upon and claims the benefit of priority from prior Japanese Patent Application No. 2019-009281, filed Jan. 23, 2019, the entire contents of which are incorporated herein by this reference.

BACKGROUND OF THE INVENTION

Field of the Invention

The embodiments herein are related to a microscope system, an access-control assistance method, and a computer-readable medium.

Description of the Related Art

In the biological field, time-lapse image shooting may be performed using a microscope system so as to record temporal changes in an object to be observed. Time-lapse image shooting, which could be continued for several days, typically requires a long time to be finished. Hence, if information acquired from time-lapse image shooting is not information needed by the user, this means that along time has been wasted.

Techniques pertaining to such a technical problem is described in, for example, Japanese Laid-open Patent Publication No. 2008-257065. Japanese Laid-open Patent Publication No. 2008-257065 describes a microscope system with which microscopic images can be viewed over a network by using a portable terminal such as a tablet terminal.

The microscope system described in Japanese Laid-open Patent Publication No. 2008-257065 allows the user to check an image acquired in a remote area without waiting for time-lapse image shooting to be finished. Thus, the user can check the status of time-lapse image shooting at any timing at any location, so that any failures in the time-lapse image shooting can be early detected. Accordingly, the microscope system described in Japanese Laid-open Patent Publication No. 2008-257065 allows waste in time that could be caused by a failure in image shooting to be reduced.

SUMMARY OF THE INVENTION

A microscope system in accordance with an aspect of the present invention includes a microscope that acquires a microscopic image and circuitry, wherein the circuitry causes the microscope to perform a series of image-shooting operations for acquiring a plurality of microscopic images and outputs an access code generated in response to the start of the series of image-shooting operations, the access code being used to access image-shooting information pertaining to the series of image-shooting operations.

An access-control assistance method in accordance with an aspect of the invention includes performing, by using a control apparatus that controls a microscope: causing the microscope to perform a series of image-shooting operations for acquiring a plurality of microscopic images; and outputting an access code generated in response to the start of the series of image-shooting operations, the access code being used to access image-shooting information pertaining to the series of image-shooting operations.

A non-transitory computer-readable medium in accordance with an aspect of the invention has stored therein a program for causing a control apparatus that controls a microscope to perform a process including causing the microscope to perform a series of image-shooting operations for acquiring a plurality of microscopic images and outputting an access code generated in response to the start of the series of image-shooting operations, the access code being used to access image-shooting information pertaining to the series of image-shooting operations.

BRIEF DESCRIPTION OF THE DRAWINGS

The present invention will be more apparent from the following detailed description when the accompanying drawings are referenced.

FIG. 3 exemplifies the functional configuration of a control apparatus 40 in accordance with a first embodiment;

FIG. 4 exemplifies the hardware configuration of a control apparatus 40 in accordance with a first embodiment;

FIG. 6 exemplifies a table T1 storing relationships between access code details and storage locations for image-shooting information;

FIG. 12 is a flowchart of an access control process performed by a control apparatus 40 in accordance with a second embodiment;

FIG. 13 exemplifies a table T2 storing relationships between access code details, storage locations for image-shooting information, and user IDs;

FIG. 15 exemplifies a table T3 storing relationships between user IDs and terminal IDs;

FIG. 19 exemplifies an exclusive control table T4;

FIG. 20 is a flowchart of an access control process performed by a control apparatus 40 in accordance with a fifth embodiment;

FIG. 23 illustrates an example of the functional configuration of a control apparatus 70 and a second control apparatus 80 in accordance with a sixth embodiment.

DESCRIPTION OF THE EMBODIMENTS

A microscope system is very expensive and thus often shared by a plurality of persons. For example, when a microscope system is used for a research purpose, image data acquired by the microscope system may be an important research outcome, and sufficient security should be ensured to prevent another person from easily viewing the image data. It will be highly important to ensure sufficient security especially for a system that can be accessed over a network from a remote location. In the meantime, constructing an excessively complicated system to ensure sufficient security could reduce the convenience of a microscope system that can be accessed over a network from a remote location. For example, excessively complicated procedures for time-lapse image shooting or for image viewing could make the user reluctant to use the function of the microscope system for allowing image data to be accessed from a remote location.

The following describes embodiments of the present invention.

First Embodiment

Figure 1:
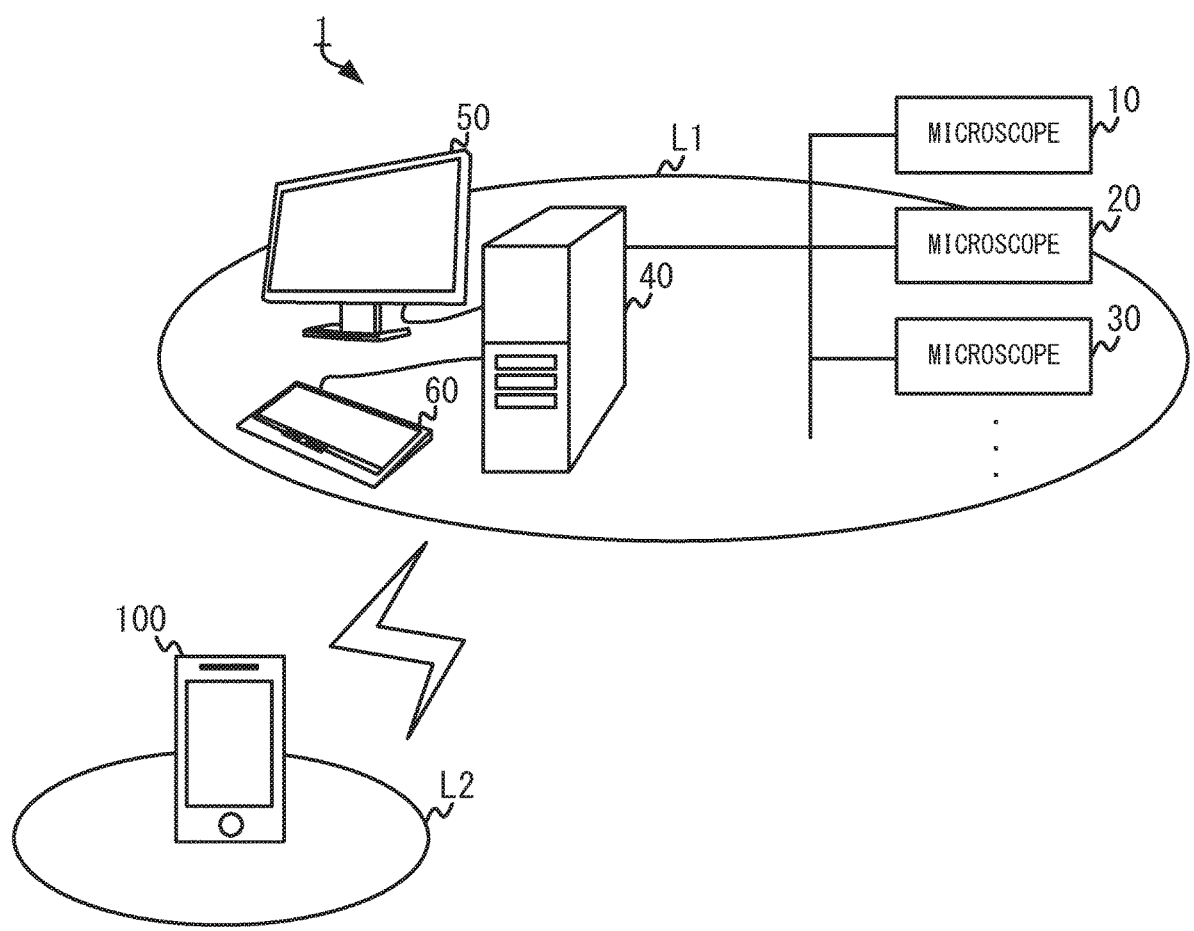
FIG. 1 exemplifies the configuration of a microscope system 1 in accordance with a first embodiment.
Figure 2:
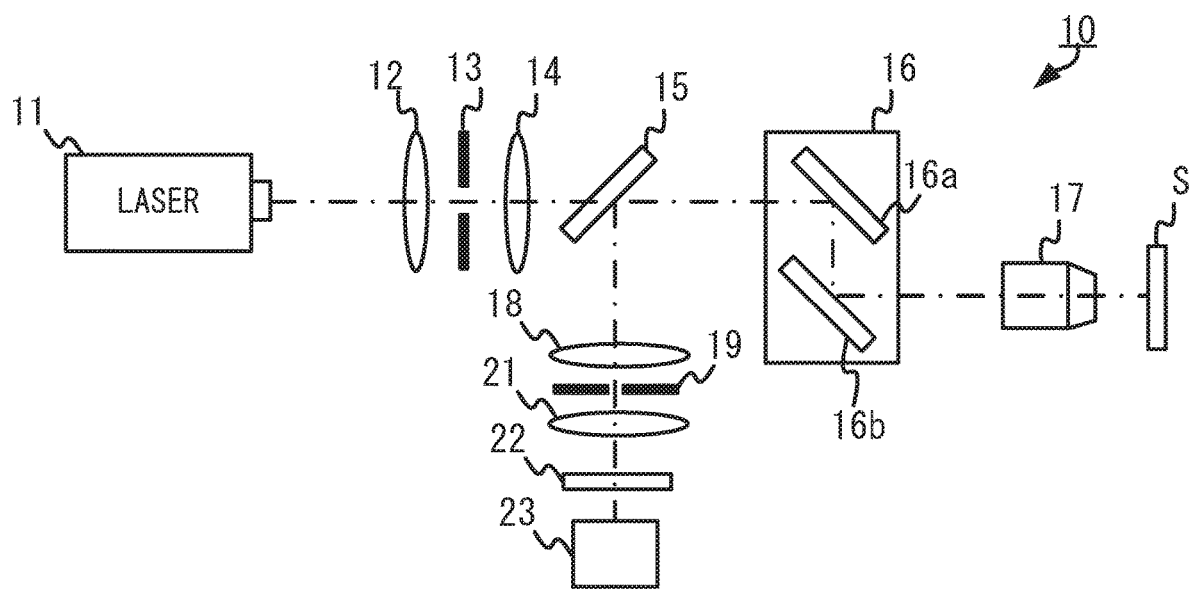
FIG. 2 exemplifies the configuration of a microscope 10 in accordance with a first embodiment.

FIG. 1 exemplifies the configuration of a microscope system 1 in accordance with the present embodiment. FIG. 2 exemplifies the configuration of a microscope 10 in accordance with the embodiment. FIG. 3 exemplifies the functional configuration of a control apparatus 40 in accordance with the embodiment. FIG. 4 exemplifies the hardware configuration of the control apparatus 40 in accordance with the embodiment. Descriptions will be given in the following of the configuration of the microscope system 1 by referring to FIGS. 1-4.

The microscope system 1 performs time-lapse image shooting and allows image-shooting information of the time-lapse image shooting to be accessed over a network immediately after the start of the time-lapse image shooting. In particular, the microscope system 1 issues an access code at the start of time-lapse image shooting. Then, the validity of access from a communication terminal 100 is assessed on the basis of the access code, so that the image-shooting information can be provided to the communication terminal 100 while ensuring security.

Image-shooting information pertains to image-shooting operations in time-lapse image shooting and is a general term for a plurality of microscopic images acquired through the image-shooting operations, setting information of the image-shooting operations, status information of the image-shooting operations (e.g., normal, abnormal), and the like, each of which can be image-shooting information.

For example, the communication terminal 100 may be a tablet computer, a smartphone, a portable telephone, or a notebook computer. The communication terminal 100 does not necessarily need to be a portable terminal. The communication terminal 100 may be a computer that has a communication function and a display function, e.g., a desktop computer, a television.

The microscope system 1 includes at least one microscope (microscope 10, 20, 30) and a control apparatus 40. The microscope system 1 may further include a display apparatus 50 and an input apparatus 60, as depicted in FIG. 1.

The display apparatus 50 is, for example, a liquid crystal display, an organic electroluminescence (OLED) display, or a cathode ray tube (CRT) display. The input apparatus 60 is, for example, a mouse, a keyboard, a joystick, or a touch panel. The input apparatus 60 outputs, to the control apparatus 40, an operation signal that corresponds to an input operation performed by a user.

FIG. 1 depicts an example in which the microscopes, the control apparatus 40, the display apparatus 50, and the input apparatus 60, which form the microscope system 1, are disposed in the same site L1, and the communication terminal 100 accesses the microscope system 1 over a network from a location L2, i.e., a position different from the position of the microscope system 1.

The network between the communication terminal 100 and the microscope system 1 is not particularly limited. The network may be, for example, a public line such as the Internet or a dedicated line. The network may be a LAN. For example, the communication terminal 100 and the microscope system 1 may be connected by a wireless LAN via an access point (not illustrated).

Each microscope is an apparatus that acquires a microscopic image and is controlled by the control apparatus 40. These microscopes have different microscope IDs. These microscopes may be of the same type or each be of a different type. The microscopes are each an apparatus for observing a sample under magnification. How the microscopes are to be used is not particularly limited. The microscope system 1 may include, for example, biological microscopes or industrial microscopes. The shapes of the microscopes are not particularly limited. The microscope system 1 may include, for example, a microscope with an exposed stage, i.e., having a conventional shape, or a box-type microscope. The following describes the configuration of the microscope 10 as an example of the configurations of the microscopes.

The microscope 10 is a laser scanning microscope (LSM). More specifically, the microscope 10 is a confocal microscope that includes a laser 11, a two-dimensional scanner 16, an objective 17, a pinhole plate 19, and an optical detector 23, as depicted in FIG. 2.

The laser 11 is a continuous wave (CW) laser, e.g., an Ar laser, a He—Ne laser. Laser light emitted from the laser 11 travels via the lens 12, the pinhole plate 13, and the lens 14, then passes through a dichroic mirror 15, and finally enters the objective 17 via the two-dimensional scanner 16. The objective 17 forms a light spot on a sample S by focusing the laser light thereon.

Upon the sample S being irradiated with the laser light, a fluorescent material is excited on the light spot, thereby radiating fluorescence having a wavelength different from that of the laser light. The fluorescence radiated from the sample S travels via the objective 17 and the two-dimensional scanner 16 and is then incident on the dichroic mirror 15 and reflected therefrom. The fluorescence reflected from the dichroic mirror 15 is collected by a lens 18. The pinhole plate 19 has a pinhole formed therein at a position optically conjugate to the focal position of the objective 17 such that the fluorescence from the light spot on the sample S passes through the pinhole plate 19. Stray light (excitation light) among the light that has passed through the pinhole plate 19 is blocked by a barrier filter 22 on which this light is incident after traveling via a lens 21. As a result, only the fluorescence passes through the barrier filter 22 and enters the optical detector 23.

For example, the optical detector 23 may be a photomultiplier tube (PMT) or the Multi-Pixel Photon Counter (MPPC®), which comprises pixels of a plurality of Geiger-mode avalanche photodiodes (Geiger-mode APDs).

The two-dimensional scanner 16 includes two galvanometer mirrors (galvanometer mirrors 16a and 16b). The two galvanometer mirrors of the two-dimensional scanner 16 may be controlled independently of each other so that a light spot formed on the sample S can be moved on the sample S in X and Y directions independently, the X and Y directions being orthogonal to the optical axis of the objective 17 and also orthogonal to each other. Thus, the microscope 10 can control the two-dimensional scanner 16 so as to two-dimensionally scan the sample S by using laser light, with the result that a microscopic image of the sample S can be acquired. The two-dimensional scanner 16 may include, instead of the galvanometer scanners, another deflector such as a resonant scanner or an acoustooptic deflector (AOD).

The control apparatus 40, which is an apparatus for controlling microscopes, is connected to at least the microscopes 10, 20, and 30. The control apparatus 40 is also connected to the display apparatus 50 and the input apparatus 60. In addition, the control apparatus 40 can communicate with the communication terminal 100 over a network.

The control apparatus 40 includes, as depicted in FIG. 3, a microscope control unit 41, a code generation unit 42, an output unit 43, a storage unit 44, and an access control unit 45 as components for providing image-shooting information to the communication terminal 100 over a network while ensuring sufficient security.

The microscope control unit 41 causes a microscope to perform image-shooting operations. In particular, the microscope control unit 41 causes a microscope to perform a series of image-shooting operations for acquiring a plurality of microscopic images, such as time-lapse image shooting.

The code generation unit 42 generates an access code for accessing image-shooting information pertaining to a series of image-shooting operations. More specifically, when start of a series of image-shooting operations is reported from the microscope control unit 41, the code generation unit 42 generates and then outputs an access code to the output unit 43. Accordingly, the code generation unit 42 generates an access code in response to start of a series of image-shooting operations. The code generation unit 42 may generate a different access code for each series of image-shooting operations. Thus, even when a plurality of series of image-shooting operations are performed, every series of image-shooting operations can be uniquely specified using an access code. A single series of image-shooting operations is performed by a single microscope and thus is not performed by a plurality of microscopes in a cooperative manner.

Accordingly, when a plurality of microscopes having different microscope IDs each perform a series of image-shooting operations, the code generation unit 42 generates a different access code for each microscope. The wording of "generating a different access code for each microscope" means that different access codes are generated for image-shooting operations performed by different microscopes but does not mean that the same access code is generated for image-shooting operations performed by the same microscope.

An access code is obtained by coding information for identifying a series of image-shooting operations (i.e., identifier). For example, the access code may be a two-dimensional code such as QR Code® or a one-dimensional code such as a bar code (e.g., CODE128, JAN/EAN/UPC). The access code itself may be information for identifying a series of image-shooting operations. The information for identifying a series of image-shooting operations, which may be an access code itself or the details of this access code, is, for example, a character string. This character string may be one in which numbers are randomly arranged or one indicating a data storage location such as the uniform resource locator (URL) of a web page or the path of a folder or file.

The output unit 43 outputs an access code generated by the code generation unit 42 from the control apparatus 40. In particular, the output unit 43 outputs the access code to the display apparatus 50. Then, the display apparatus 50 displays the access code output from the output unit 43.

However, the destination of an output access code is not limited to the display apparatus 50. For example, the output unit 43 may output an access code to a printing apparatus, and the printing apparatus may print out the access code output from the output unit 43. The output unit 43 may output an access code to an e-mail server, a FAX server, or the like. The output unit 43 may transmit an access code to a user's portable telephone or the like by using a short message service (SMS). In particular, the output unit 43 may output an access code to an output apparatus that can output the access code in a manner such that the user can be notified of this code.

The output unit 43 may output, in accordance with a predetermined input from the input apparatus 60, an access code generated by the code generation unit 42. For example, in response to a user inputting an output instruction by using the input apparatus 60, the output unit 43 may output an access code generated by the code generation unit 42 to the display apparatus 50. Then, the display apparatus 50 may display the access code.

The storage unit 44 stores a plurality of microscopic images acquired through a series of image-shooting operations. When the series of image-shooting operations is time-lapse image shooting, the plurality of microscopic images are microscopic images of a sample S each acquired at a different time. The storage unit 44 stores every microscopic image newly acquired. Thus, the storage unit 44 stores microscopic images acquired during a period from the start of time-lapse image shooting up to the present time.

The access control unit 45 controls access from the communication terminal 100 to image-shooting information pertaining to a series of image-shooting operations. In particular, when the communication terminal 100 has requested permission to access the image-shooting information, the access control unit 45 assesses the validity of access from the communication terminal 100 to the image-shooting information on the basis of at least the input information transmitted from the communication terminal 100 and either the access code or the details of this access code. More specifically, the access control unit 45 assesses the validity of the access on the basis of a result of comparison between the input information and either the access code or the details of this access code. As an example, when the input information matches the access code or the details of this access code, it may be determined that the access is valid; otherwise, it may be determined that the access is invalid. When determining that the access is valid, the access control unit 45 transmits the image-shooting information to the communication terminal 100; otherwise, the access control unit 45 does not transmit the image-shooting information to the communication terminal 100.

The control apparatus 40 may be a general-purpose or special-purpose apparatus. For example, the control apparatus 40 may be, but is not particularly limited to, a computer that has a hardware configuration such as that depicted in FIG. 4. Specifically, the control apparatus 40 may include a processor 40a, a memory 40b, an auxiliary storage apparatus 40c, an input-output interface 40d, a medium drive apparatus 40e, and a communication control apparatus 40f, all of which may be connected to each other by a bus 40g.

The processor 40a is, for example, an arbitrary processing apparatus that includes a central processing unit (CPU). The processor 40a may implement the components of the control apparatus 40 depicted in FIG. 3 by performing a programmed process by executing a program stored in the memory 40b, the auxiliary storage apparatus 40c, or a recording medium 40h. The processor 40a may be configured using a special-purpose processor such as an ASIC or an FPGA.

The memory 40b is a working memory for the processor 40a. The memory 40b is, for example, an arbitrary semiconductor memory such as a random access memory (RAM). The auxiliary storage apparatus 40c is a nonvolatile memory such as an erasable programmable ROM (EPROM), a hard disc drive, or a flash memory. The input-output interface 40d communicates information with an external apparatus (microscopes 10, 20, and 30, display apparatus 50, input apparatus 60).

The medium drive apparatus 40e may output data stored in the memory 40b or the auxiliary storage apparatus 40c to the recording medium 40h and read a program, data, and the like from the recording medium 40h. The recording medium 40h is an arbitrary portable recording medium. For example, the recording medium 40h may include an SD card, a universal serial bus (USB) flash memory, a compact disc (CD), and a digital versatile disc (DVD). The memory 40b, the auxiliary storage apparatus 40c, and the recording medium 40h are each a computer-readable recording medium.

The communication control apparatus 40f inputs/outputs information to/from a network. For example, a network interface card (NIC) or a radio communication module may be used as the communication control apparatus 40f. The radio communication module is, for example, a Wi-Fi module, a Bluetooth® module, a Bluetooth Low Energy (BLE) module and includes an antenna, a radio frequency (RF) unit, and a baseband unit. The bus 40g connects the processor 40a, the memory 40b, the auxiliary storage apparatus 40c, and the like to each other in a manner such that data can be communicated therebetween.

The user of the microscope system 1 configured as described above obtains in advance an access code generated in response to a series of image-shooting operations. The access code may be transmitted to the microscope system 1 by using the communication terminal 100 so that image-shooting information pertaining to the series of image-shooting operations can be accessed from any location at any timing.

Figure 5:
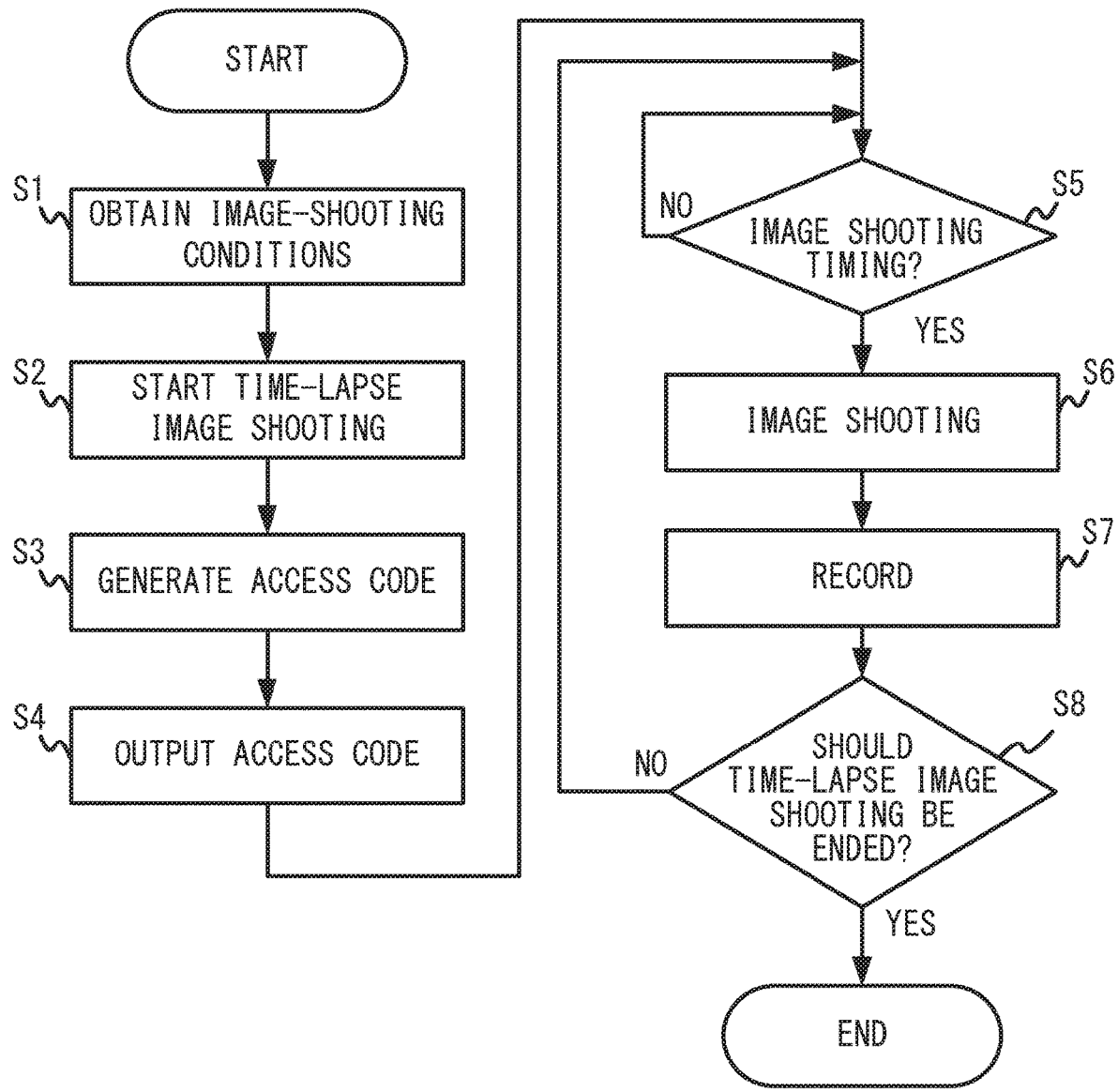
FIG. 5 is a flowchart of image-shooting operations performed by a control apparatus 40 in accordance with a first embodiment.
Figure 7:
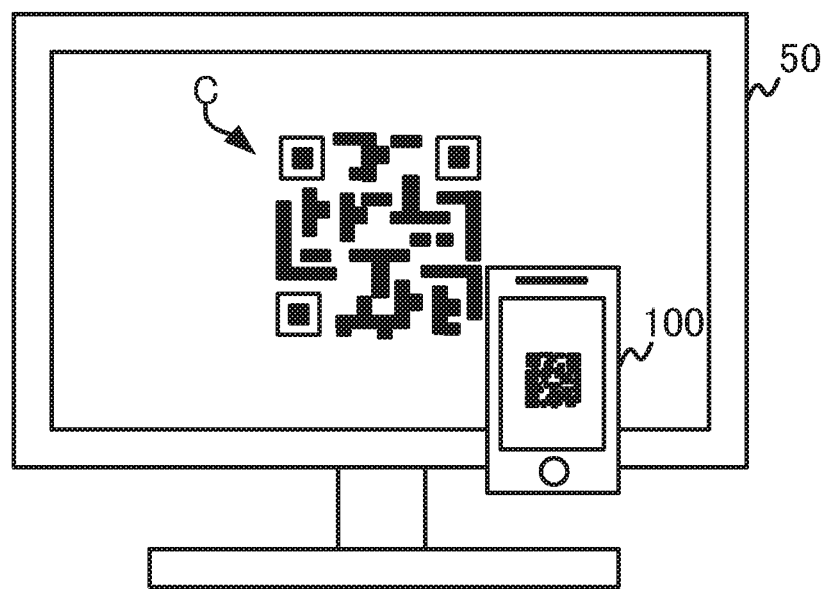
FIG. 7 is an explanatory diagram for a method of obtaining an access code.
Figure 8:
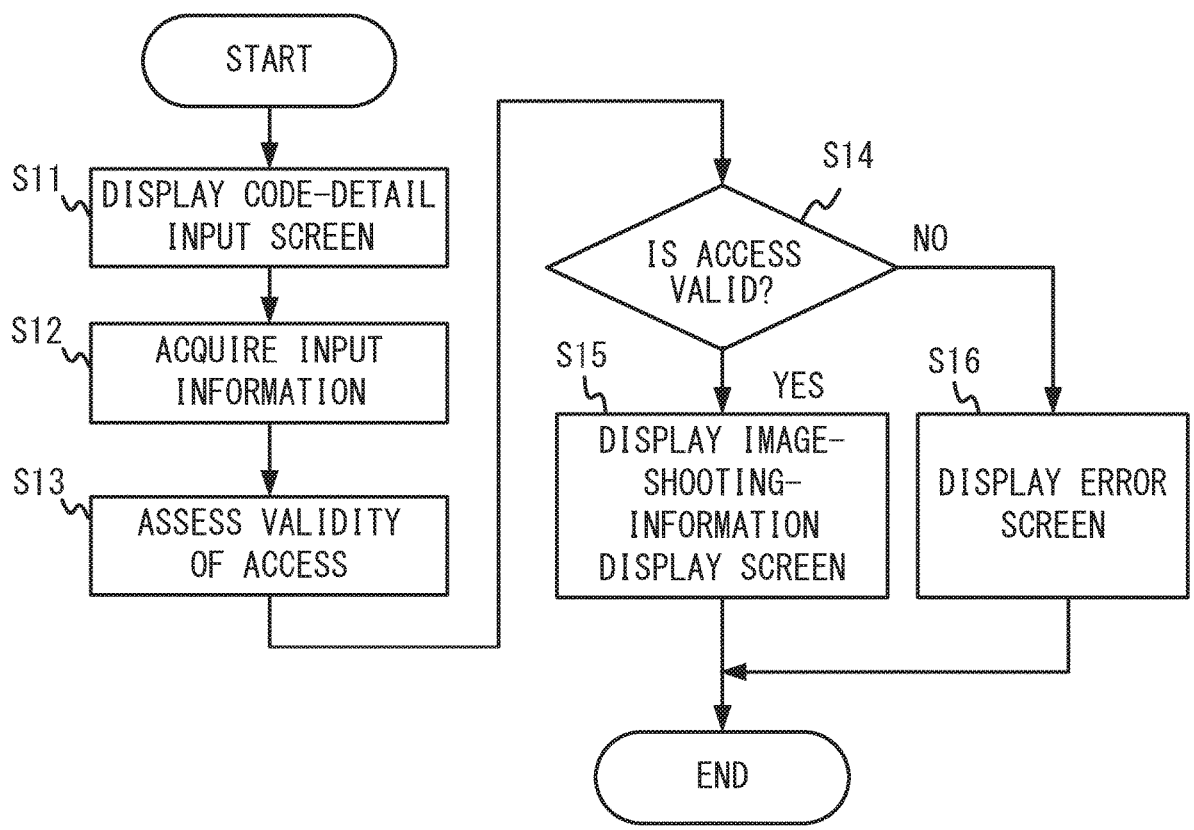
FIG. 8 is a flowchart of an access control process performed by a control apparatus 40 in accordance with a first embodiment.
Figure 9:
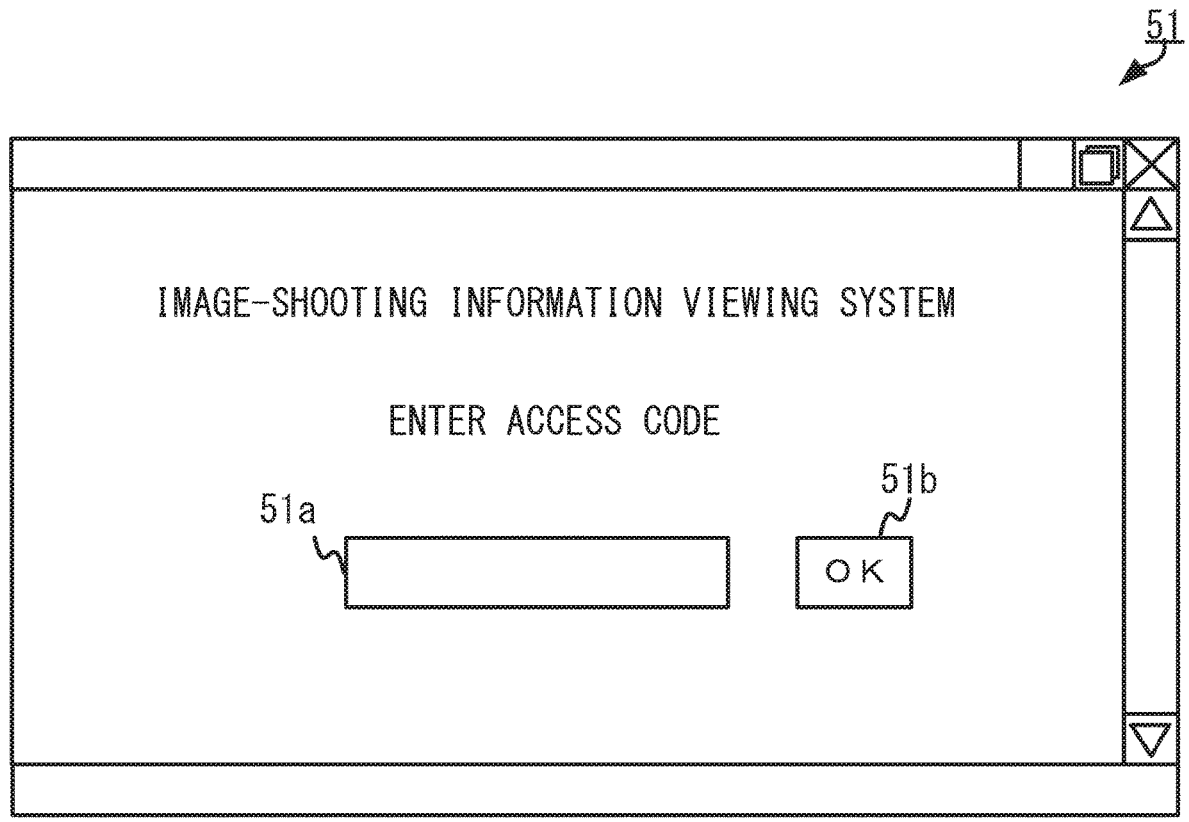
FIG. 9 illustrates an example of a code input screen.
Figure 10:
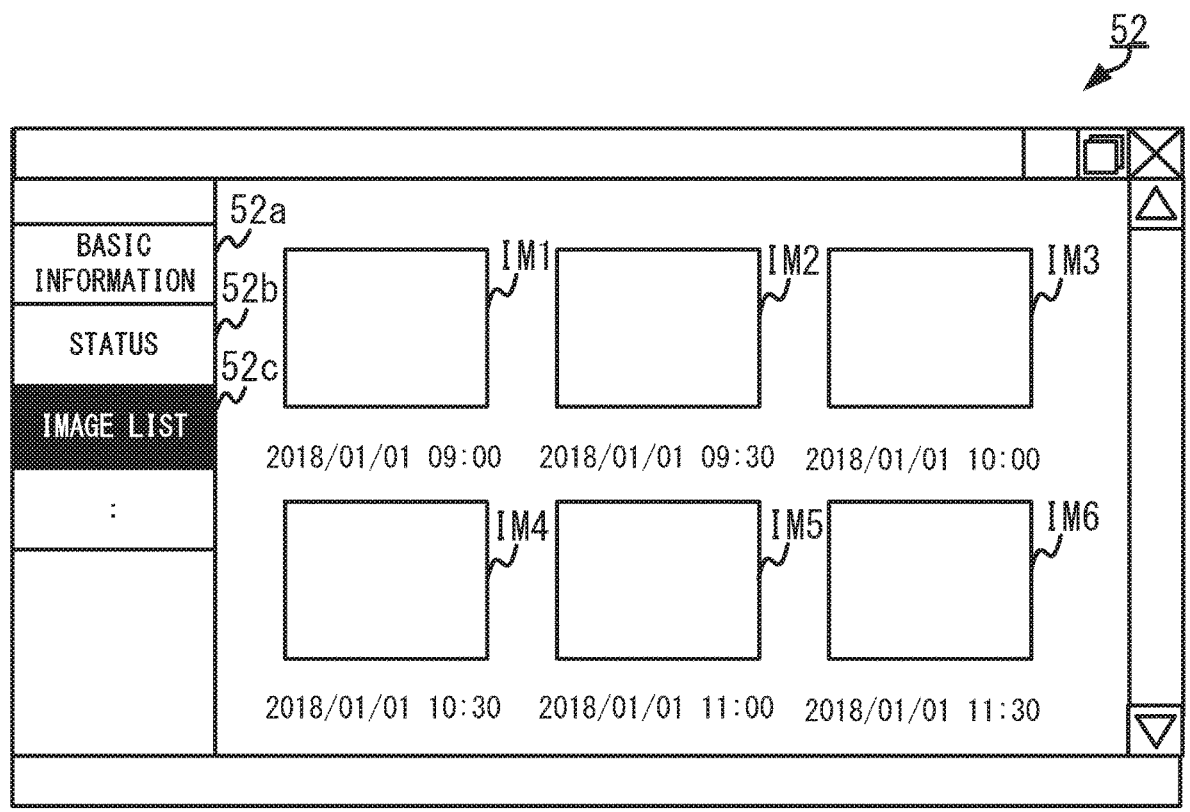
FIG. 10 illustrates an example of an image-shooting-information display screen.
Figure 11:
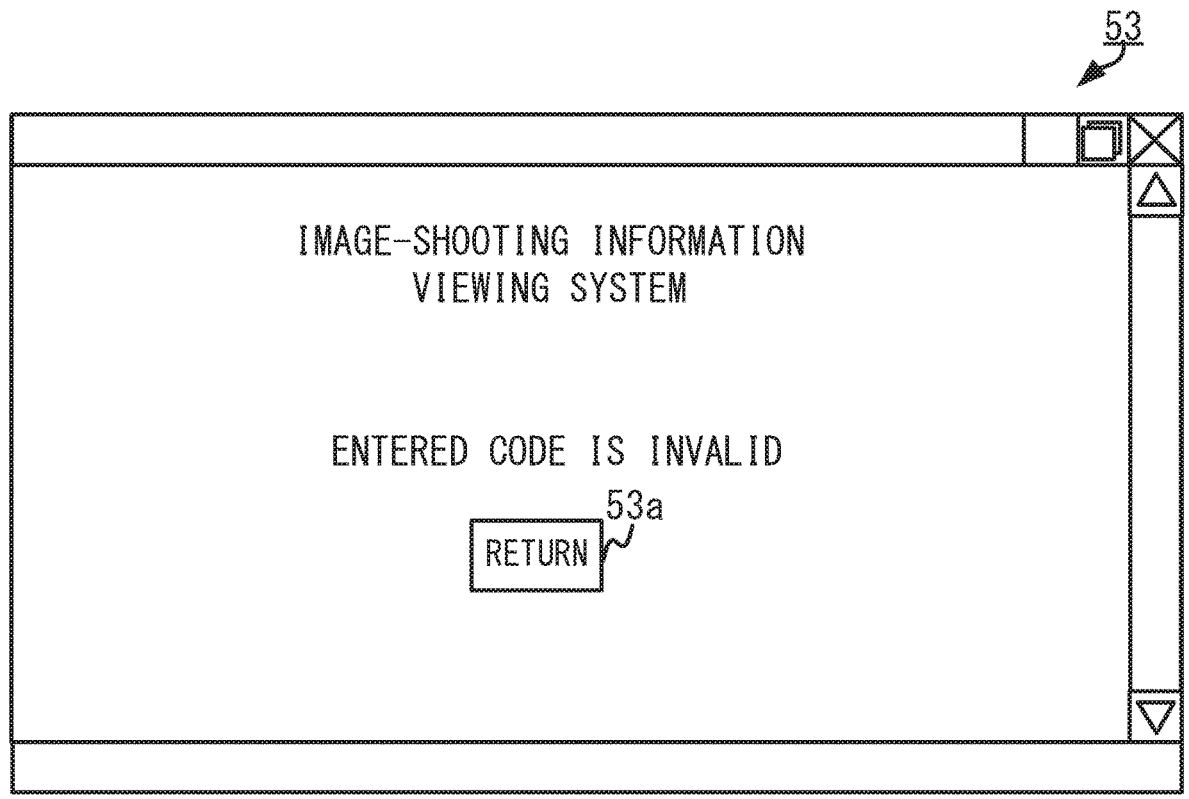
FIG. 11 exemplifies an error screen.

The following describes examples of specific processes performed by the microscope system 1 by referring to FIGS. 5-11. FIG. 5 is a flowchart of image-shooting operations performed by the control apparatus 40 in accordance with the present embodiment. FIG. 6 exemplifies a table T1 storing relationships between access code details and storage locations for image-shooting information. FIG. 7 is an explanatory diagram for a method of obtaining an access code. FIG. 8 is a flowchart of an access control process performed by the control apparatus 40 in accordance with the present embodiment. FIG. 9 illustrates an example of a code input screen. FIG. 10 illustrates an example of an image-shooting-information display screen. FIG. 11 exemplifies an error screen.

Descriptions will be given in the following of a process performed by the control apparatus 40 when the user of the microscope system 1 has given an instruction to start time-lapse image shooting by operating the microscope system 1 in a site L1.

When an instruction to start image shooting is given, the control apparatus 40 performs an image-shooting process depicted in FIG. 5. Note that the image-shooting process depicted in FIG. 5 indicates an example of the access-control assistance method.

The control apparatus 40 obtains image-shooting conditions (step S1). In this example, the microscope control unit 41 obtains image-shooting conditions designated by the user using the input apparatus 60. For example, the image-shooting conditions may include a microscope to be used for image shooting, an image-shooting time interval, the number of images to be shot, a total image-shooting time, the XY coordinates of an image-shooting point, a focus position (Z coordinate), intensity of illumination, an illumination wavelength, a received-light wavelength, image-shooting sensitivity, exposure time, observation magnification, and a storage location for image-shooting information. The following description is based on an exemplary situation in which the microscope 10 is used for image shooting.

The control apparatus 40 sets the image-shooting conditions obtained in step S1 and starts time-lapse image shooting (step S2). In this example, the microscope control unit 41 starts to control the microscope 10.

Upon starting time-lapse image shooting, the control apparatus 40 generates an access code (step S3). In this example, the code generation unit 42, which has received a report of the start of image shooting from the microscope control unit 41, generates, for example, a QR code as an access code and then outputs this code to the output unit 43. The QR code includes an arbitrary character string as details thereof. In addition, the code generation unit 42 associates the details of the generated QR code and the storage location for image-shooting information that has been acquired in step S1 and stores these associated items in the storage unit 44.

The table T1 depicted in FIG. 6, which is a table associating the details of QR codes with storage locations for image-shooting information, is provided within the storage unit 44. For example, the code generation unit 42 may associate the details of the QR code with the storage location for the image-shooting information and store these associated items in the table T1 of the storage unit 44.

The control apparatus 40 outputs the access code generated in step S3 (step S4). In this example, the output unit 43 outputs the QR code received from the code generation unit 42 to the display apparatus 50.

Accordingly, the display apparatus 50 displays a QR code C, as depicted in FIG. 7. After giving an instruction to start time-lapse image shooting, the user of the microscope system 1 may start a QR-code reading application installed in the communication terminal 100 of this user so that the details of the QR code can be easily obtained by reading the QR code C displayed on the display apparatus 50.

The control apparatus 40 waits until an image-shooting time specified on the basis of the image-shooting conditions obtained in step S1 (step S5) and, at the image-shooting time, instructs the microscope 10 to shoot an image (step S6). In this example, the microscope control unit 41 instructs the microscope 10 to acquire an image, then the microscope 10 acquires a microscopic image of a sample S, and finally the microscope control unit 41 receives the microscopic image from the microscope 10.

The control apparatus 40 records the microscopic image acquired in step S6 (step S7). In this example, the storage unit 44 stores the microscopic image in the storage location for the image-shooting information that has been acquired in step S1.

The control apparatus 40 determines whether to end time-lapse image shooting (step S8) and repeats the processes of steps S5-S8 until determining to end the time-lapse image shooting.

The control apparatus 40 may perform, as described above, the image-shooting process depicted in FIG. 5, thereby allowing the user of the microscope system 1 to easily obtain an access code. More specifically, the user may simply perform ordinary operations for time-lapse image shooting on the microscope system 1, resulting in the display apparatus 50 of the microscope system 1 displaying an access code without elapse of a long time after the start of the time-lapse image shooting. Hence, the user can easily obtain the access code displayed on the display apparatus 50 by reading this code with the communication terminal 100.

The control apparatus 40 may perform the image-shooting process depicted in FIG. 5, thereby allowing the user of the microscope system 1 to obtain an access code while ensuring security. The microscope system 1 generates an access code in response to start of time-lapse image shooting and then outputs this code to the display apparatus 50. Hence, when an access code is displayed, the user who has given an instruction to start time-lapse image shooting is assumed to be positioned close to the display apparatus 50, and persons to be provided with the access code by the user can be limited. For example, when the user does not wish to provide another person with an access code, he/she may end the displaying of the access code soon after reading the access code. When performing time-lapse image shooting for, for example, a research with group members, the user may allow only the members to read the access code displayed on the display apparatus 50.

Accordingly, the microscope system 1 may perform the above-described image-shooting process so as to allow an access code to be easily obtained while ensuring sufficient security without requiring the user to take excessively complicated procedures.

Next, descriptions will be given in the following of a process performed by the control apparatus 40 when a user who has obtained an access code accesses the microscope system 1 by operating the communication terminal 100 in a site L2 distant from the site L1. The following description is based on an example in which the control apparatus 40 is operated as a Web server.

The control apparatus 40 performs an access control process depicted in FIG. 8 upon receipt of such a request from the communication terminal 100. Note that the access control process depicted in FIG. 8 indicates an example of the access-control assistance method.

The control apparatus 40 returns a response that includes a code-detail input screen to the communication terminal 100, thereby causing the communication terminal 100 to display the code-detail input screen (step S11). In this case, for example, the access control unit 45 may create and transmit a screen 51 depicted in FIG. 9 to the communication terminal 100. Then, the communication terminal 100 may display the screen 51.

Subsequently, the user inputs, to a text box 51a on the screen 51, the details of the access code obtained in the image-shooting process depicted in FIG. 5; and then when the user taps a button 51b to request permission to access the image-shooting information, the control apparatus 40 acquires the input information included in the request from the communication terminal 100 (step S12). In this example, the access control unit 45 acquires, as the input information, information entered into the text box 51a.

The control apparatus 40 assesses the validity of access to the image-shooting information (step S13). In this example, the access control unit 45 assesses the validity of the access on the basis of a result of comparison between the input information and the details of the access codes stored in the table T1. When the input information matches any of the details of the access codes stored in the table T1, the access control unit 45 determines that the access is valid; otherwise, the access control unit 45 determines that the access is invalid.

When it is determined that the access is valid (YES in step S14), the control apparatus 40 returns a response that includes an image-shooting-information display screen to the communication terminal 100, thereby causing the communication terminal 100 to display the image-shooting-information display screen (step S15). In this case, for example, the access control unit 45 may read, from the table T1, a storage location for the image-shooting information that has been associated with the access code details matching the input information, and then create a screen 52 depicted in FIG. 10 on the basis of the image-shooting information read from the storage location. The access control unit 45 transmits the screen 52 to the communication terminal 100, and the communication terminal 100 displays the screen 52. The screen 52 displays a list of a plurality of microscopic images (images IM1-IM6) that have already been acquired in the time-lapse image shooting. Different screens created on the basis of image-shooting information may be displayed by selecting one of tabs 52a-52c.

When it is determined that the access is not valid (NO in step S14), the control apparatus 40 returns a response that includes an error screen to the communication terminal 100, thereby causing the communication terminal 100 to display the error screen (step S16). In this case, for example, the access control unit 45 may create and transmit the screen 53 depicted in FIG. 11 to the communication terminal 100. Then, the communication terminal 100 may display the screen 53. The user can return to the screen 51 depicted in FIG. 9 by tapping a button 53a.

The control apparatus 40 may perform, as described above, the access control process depicted in FIG. 8, thereby causing the microscope system 1 to allow only a person who has correctly input the details of an access code to access image-shooting information. In addition, the user of the microscope system 1 can access image-shooting information by simply inputting the details of an access code, so that the microscope system 1 can avoid imposing an excessively large burden on the user in procedures for viewing.

Therefore, the microscope system 1 can allow the user to access image-shooting information such as a microscopic image over a network while ensuring sufficient security without loss of the convenience of the system.

Second Embodiment

FIG. 12 is a flowchart of an access control process performed by the control apparatus 40 in accordance with the present embodiment. FIG. 13 exemplifies a table T2 storing relationships between access code details, storage locations for image-shooting information, and user IDs.

The microscope system in accordance with the present embodiment is different from the microscope system 1 in that the control apparatus 40 of the former performs an access control process depicted in FIG. 12 instead of the access control process depicted in FIG. 8. The microscope system in accordance with the present embodiment is also different from the microscope system 1 in that the storage unit 44 of the former includes the table T2 depicted in FIG. 13 instead of the table T1 depicted in FIG. 6. Otherwise, the microscope system in accordance with the present embodiment is similar to the microscope system 1. The microscope system in accordance with the present embodiment will hereinafter be simply referred to as a microscope system.

The control apparatus 40 starts the access control process depicted in FIG. 12 upon receipt of such a request from the communication terminal 100. The control apparatus 40 returns a response that includes a login screen to the communication terminal 100, thereby causing the communication terminal 100 to display the login screen (step S21).

The control apparatus 40 obtains a user ID and password input by the user (step S22) and determines whether the user is authenticable (step S23). When the authentication does not succeed (NO in step S23), the control apparatus 40 causes the communication terminal 100 to display the login screen again.

When the authentication succeeds, the control apparatus 40 causes the communication terminal 100 to display the code-detail input screen (step S24) and acquires input information (step S25). The processes of steps S24 and S25 are similar to those of steps S11 and S12 depicted in FIG. 8.

The control apparatus 40 assesses the validity of access to the image-shooting information (step S26). In this example, the access control unit 45 assesses the validity of the access on the basis of the user ID obtained in step S22 and a result of comparison between the input information and the details of the access codes stored in the table T2. The access control unit 45 determines that the access is valid when the input information matches any of the access code details stored in the table T2 and the user ID obtained in step S22 matches a user ID stored in the table T2 that has been associated with the access code that matches the input information.

Note that the user IDs stored in the table T2, i.e., user identification information, are each the user ID of a user who input an instruction to start time-lapse image shooting. When starting time-lapse image shooting, the user logs in to the microscope system in advance, with the result that the user ID is stored in the table T2 together with access code details and a storage location.

When it is determined that the access is valid (YES in step S27), the control apparatus 40 causes the communication terminal 100 to display the image-shooting-information display screen (step S28). When it is determined that the access is not valid (NO in step S27), the control apparatus 40 causes the communication terminal 100 to display the error screen (step S29). The processes of steps S28 and S29 are similar to those of steps S15 and S16 depicted in FIG. 8.

As with the microscope system 1, the microscope system in accordance with the present embodiment can allow the user to access image-shooting information such as a microscopic image over a network while ensuring sufficient security without loss of the convenience of the system. The microscope system in accordance with the present embodiment is such that a user ID used for user authentication is also used to check whether access to image-shooting information is access from the user who has given an instruction to perform time-lapse image shooting, so that it can be determined whether the access is valid. Therefore, the risk of disclosing image-shooting information to persons other than the owner thereof can be reduced, thereby ensuring higher security than the microscope system 1.

Third Embodiment

Figure 14:
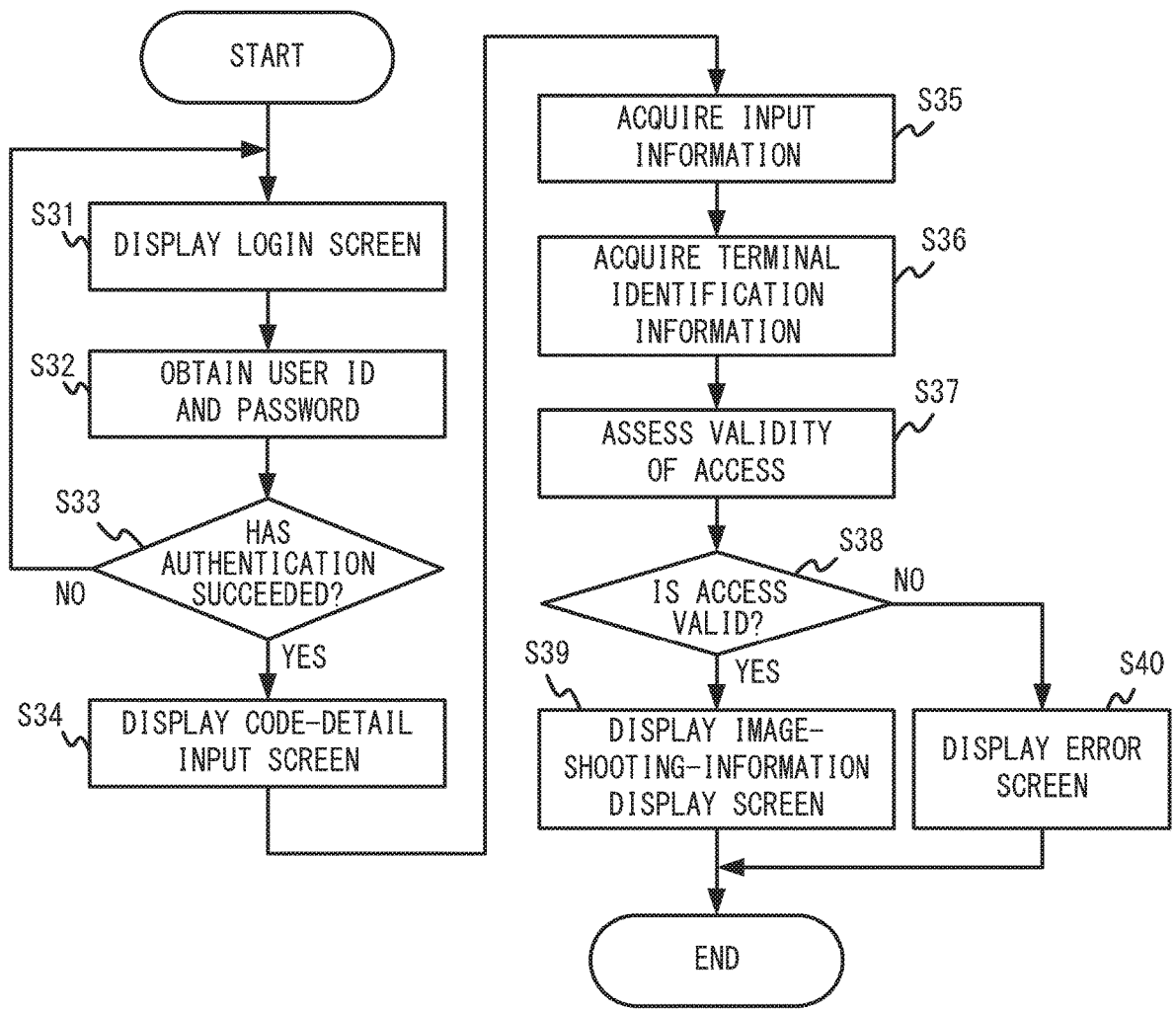
FIG. 14 is a flowchart of an access control process performed by a control apparatus 40 in accordance with a third embodiment.

FIG. 14 is a flowchart of an access control process performed by the control apparatus 40 in accordance with the present embodiment. FIG. 15 exemplifies a table T3 storing relationships between user IDs and terminal IDs.

The microscope system in accordance with the present embodiment is different from the microscope system 1 in that the control apparatus 40 of the former performs an access control process depicted in FIG. 14 instead of the access control process depicted in FIG. 8. The microscope system in accordance with the present embodiment is also different from the microscope system 1 in that the storage unit 44 of the former includes the table T2 depicted in FIG. 13 and the table T3 depicted in FIG. 15, instead of the table T1 depicted in FIG. 6. Otherwise, the microscope system in accordance with the present embodiment is similar to the microscope system 1. The microscope system in accordance with the present embodiment will hereinafter be simply referred to as a microscope system.

The control apparatus 40 starts the access control process depicted in FIG. 14 upon receipt of such a request from the communication terminal 100. The processes of steps S31-S35 are similar to those of steps S21-S25 depicted in FIG. 12.

When input information is acquired, the control apparatus 40 acquires terminal identification information (step S36). In this example, the access control unit 45 acquires terminal identification information by using an arbitrary method. The terminal identification information may be information for uniquely identifying the communication terminal 100, e.g., the MAC address or IP address of the communication terminal 100. Alternatively, the terminal identification information may be, for example, an identifier assigned to the communication terminal 100 by the microscope system 1 (hereinafter referred to as a terminal ID).

An example of a method of obtaining a terminal ID is such that the user logs in to the microscope system in advance by using the communication terminal 100 so as to, for example, register the communication terminal 100 in the microscope system. In this case, the control apparatus 40 creates a terminal ID for the communication terminal 100 and then stores this terminal ID and the user ID in the table T3 depicted in FIG. 15 after associating these IDs with each other. In addition, the control apparatus 40 transmits a cookie describing the created terminal ID to the communication terminal 100, and the communication terminal 100 stores this cookie. After this, when the communication terminal 100 accesses the microscope system, the control apparatus 40 may obtain the terminal ID by making a request for the communication terminal 100 to present the cookie.

An example of a method of obtaining a MAC address is such that when, for example, the communication terminal 100 accesses the microscope system 1 from the same LAN as the control apparatus 40, the MAC address of the communication terminal 100 may be obtained by referring to the MAC address of the source of the header of an Ethernet® frame. An interface such as Web Application Programming Interface (Web API) for communicating IDs such as MAC addresses may be provided on the control-apparatus-40 side, and the communication terminal 100 may set an ID for the interface and pass this ID to the control-apparatus-40 side.

When the terminal identification information is acquired, the control apparatus 40 assesses the validity of access to the image-shooting information (step S37). In this example, the access control unit 45 assesses the validity of the access on the basis of the terminal identification information acquired in step S36 and a result of comparison between the input information and the details of the access codes stored in the table T2. The access control unit 45 determines that the access is valid when the input information matches any of the access code details stored in the table T2 and the terminal identification information acquired in step S36 matches a terminal ID stored in the table T3 that has been associated with the user ID obtained in step S32.

When it is determined that the access is valid (YES in step S38), the control apparatus 40 causes the communication terminal 100 to display the image-shooting-information display screen (step S39). When it is determined that the access is not valid (NO in step S38), the control apparatus 40 causes the communication terminal 100 to display the error screen (step S40). The processes of steps S39 and S40 are similar to those of steps S15 and S16 depicted in FIG. 8.

As with the microscope system 1, the microscope system in accordance with the present embodiment can allow the user to access image-shooting information such as a microscopic image over a network while ensuring sufficient security without loss of the convenience of the system. The microscope system in accordance with the present embodiment may acquire terminal identification information so as to limit terminals that can access to image-shooting information to those registered in advance. Accordingly, a high security level can be set in advance for terminals allowed to be registered, so as to reduce the risk of leak of information from terminals for which a sufficient security measure is not taken, so that security higher than that of the microscope system 1 can be ensured.

Fourth Embodiment

Figure 16:
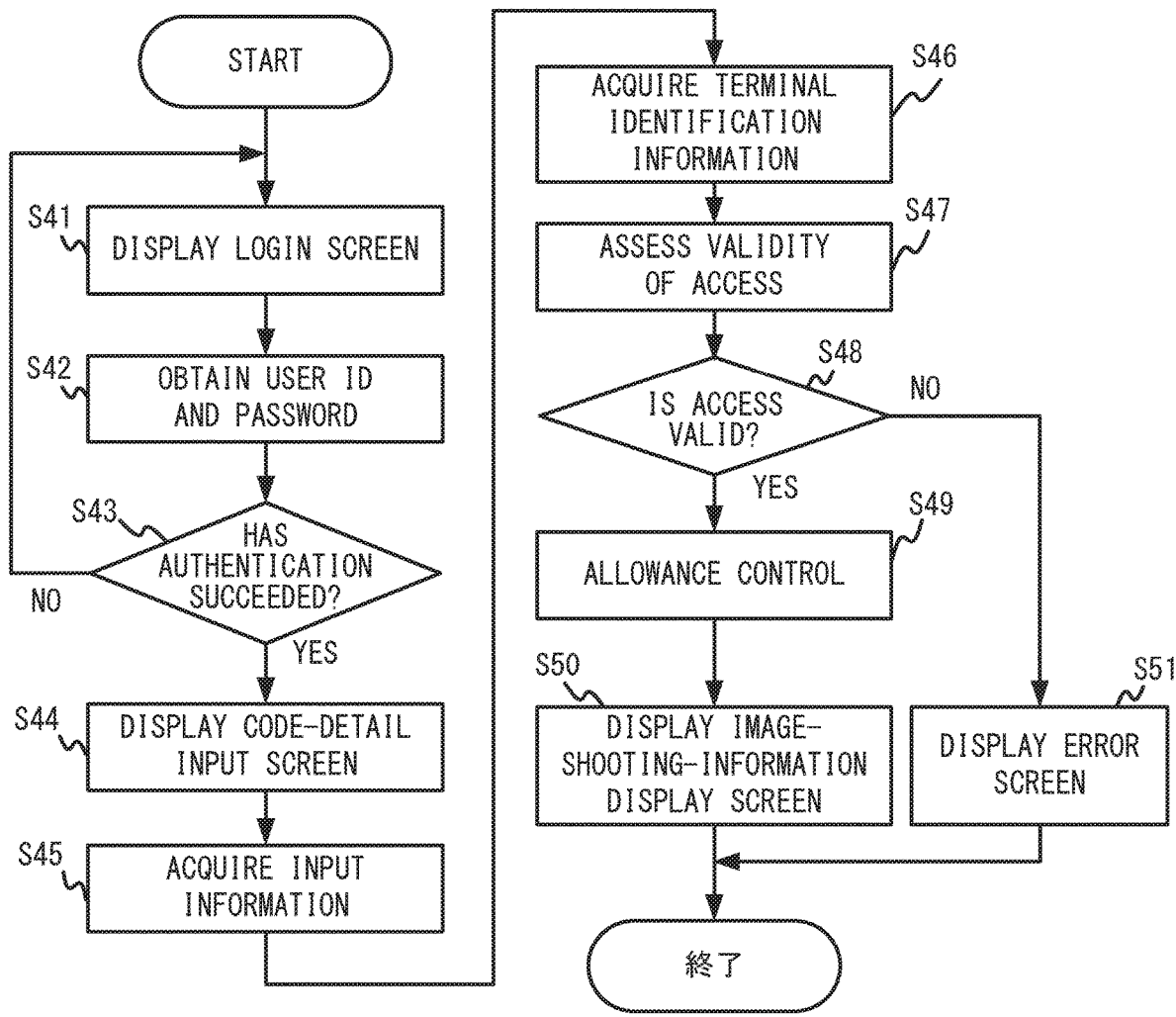
FIG. 16 is a flowchart of an access control process performed by a control apparatus 40 in accordance with a fourth embodiment.
Figure 17:
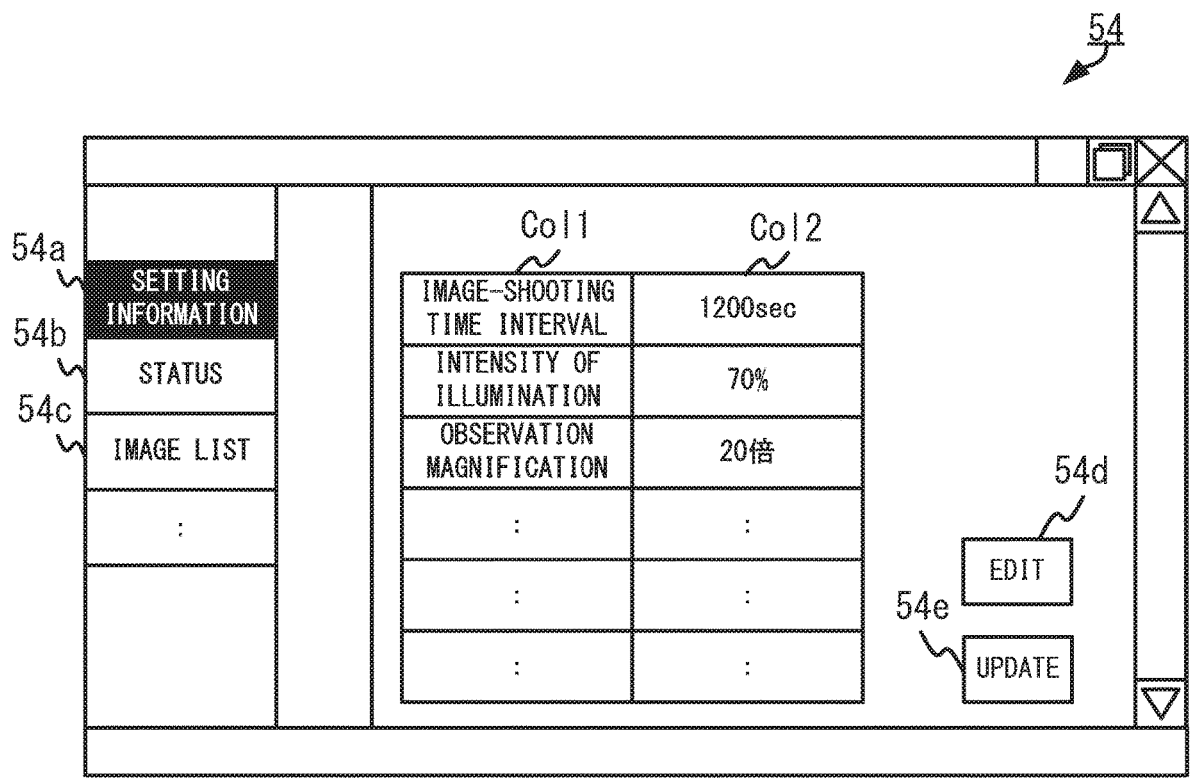
FIG. 17 illustrates another example of an image-shooting-information display screen.
Figure 18:
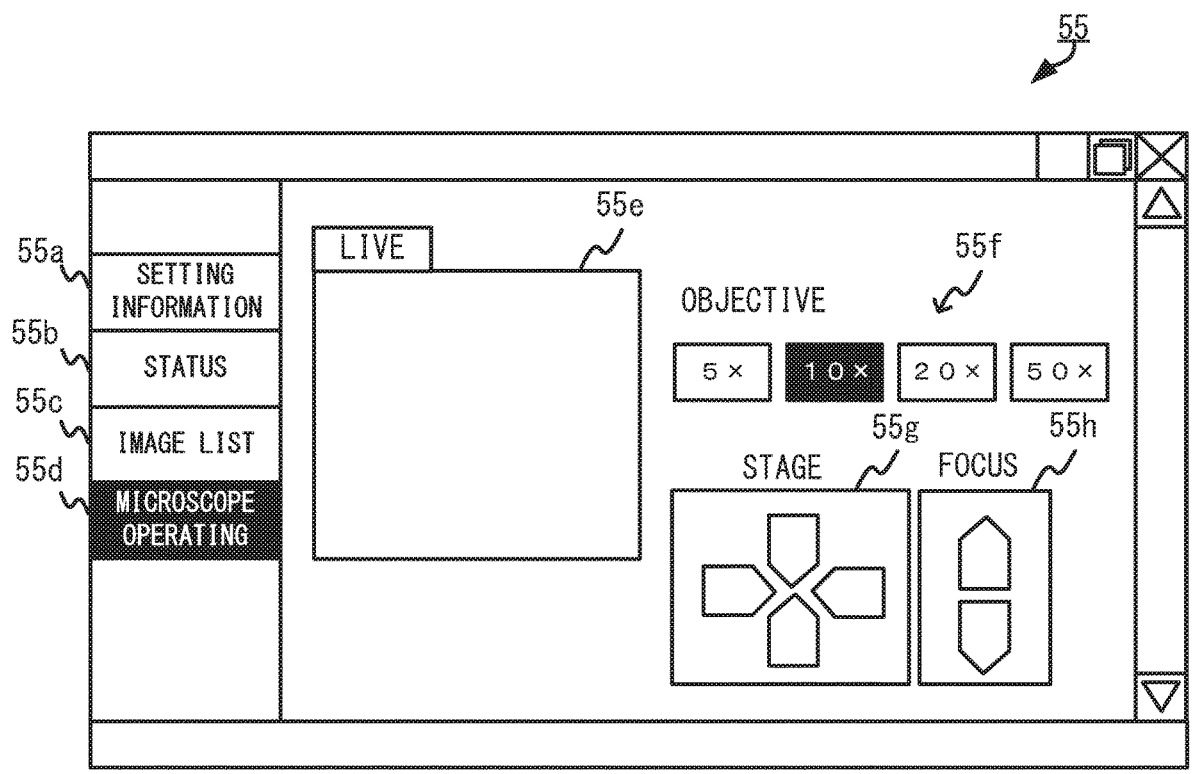
FIG. 18 illustrates still another example of an image-shooting-information display screen.

FIG. 16 is a flowchart of an access control process performed by the control apparatus 40 in accordance with the present embodiment. FIG. 17 illustrates another example of the image-shooting-information display screen. FIG. 18 illustrates still another example of the image-shooting-information display screen. FIG. 19 exemplifies an exclusive control table T4.

The microscope system in accordance with the present embodiment is different from the microscope system 1 in that the control apparatus 40 of the former performs an access control process depicted in FIG. 16 instead of the access control process depicted in FIG. 8. The microscope system in accordance with the present embodiment is also different from the microscope system 1 in that the storage unit 44 of the former includes the table T4 depicted in FIG. 19. Otherwise, the microscope system in accordance with the present embodiment is similar to the microscope system 1. The microscope system in accordance with the present embodiment will hereinafter be simply referred to as a microscope system.

The control apparatus 40 starts the access control process depicted in FIG. 16 upon receipt of such a request from the communication terminal 100. The processes of steps S41-S48 are similar to those of steps S31-S38 depicted in FIG. 14.

When it is determined that access is valid (YES in step S48), the control apparatus 40 performs allowance control on the basis of terminal identification information acquired in step S46 (step S49). In this example, the access control unit 45 creates a screen that corresponds to a right assigned to each terminal in advance. For example, the access control unit 45 may create, in accordance with a terminal specified on the basis of the terminal identification information, a screen that is to be used not only to refer to image-shooting information but also to edit or update the image-shooting information. The access control unit 45 may create, in accordance with a terminal specified on the basis of the terminal identification information, a screen for changing the settings of time-lapse image-shooting operations, such as that depicted in FIG. 17. The access control unit 45 may create, in accordance with a terminal specified on the basis of the terminal identification information, a screen for controlling the microscope during the intervals between time-lapse image-shooting operations, such as that depicted in FIG. 18.

A screen 54 depicted in FIG. 17 is a screen for changing the settings of time-lapse image-shooting operations that is displayed by selecting a tab 54a, i.e., an example of the image-shooting-information display screen. The user may tap a button 54d to allow a column Col2 to be edited. After edition, the user may tap a button 54e to update the settings of the time-lapse image-shooting operations. For example, when the user determines as a result of referring to an image acquired in time-lapse image shooting that images should be acquired at higher temporal resolution, the image-shooting time intervals in time-lapse image shooting may be reduced on the screen 54. Although a column Col1 exemplifies image-shooting time interval, intensity of illumination, and observation magnification as setting items, other image-shooting conditions can be changed.

A screen 55 depicted in FIG. 18 is a microscope operating screen displayed by selecting a tab 55d, i.e., an example of the image-shooting-information display screen. While viewing a live image displayed within a region 55e, the user may control the microscope during the intervals between time-lapse image-shooting operations so as to check the state of an arbitrary portion of the sample S. The observation magnification may be changed by selecting a button of a button group 55f. A D-pad 55g may be tapped to move the stage so that different regions on the sample S can be observed. An up and down arrow key 55h may be tapped to manually adjust the focus.

The control apparatus 40 causes the communication terminal 100 to display the image-shooting-information display screen created under the allowance control performed in step S49 (step S50).

When it is determined that the access is not valid (NO in step S48), the control apparatus 40 causes the communication terminal 100 to display the error screen (step S51). The process of step S51 is similar to that of step S16 depicted in FIG. 8.

As with the microscope system 1, the microscope system in accordance with the present embodiment can allow the user to access image-shooting information such as a microscopic image over a network while ensuring sufficient security without loss of the convenience of the system. Terminals that access the microscope system may each be allowed to perform a different task. Accordingly, for example, a plurality of persons may be provided with an access code so as to cooperatively monitor the status of time-lapse image shooting, and only one person who owns a certain terminal may be allowed to change the settings of time-lapse image-shooting operations on an as-needed basis.

In the examples described above, it is determined on the basis of terminal identification information whether to allow at least either the changing of the settings of time-lapse image shooting or the controlling of the microscope during the intervals between time-lapse image-shooting operations to be performed. However, such a determination may be made on the basis of a user ID. In particular, the access control unit 45 may determine on the basis of at least either terminal identification information or user identification information whether to allow at least either the changing of the settings of time-lapse image shooting or the controlling of the microscope during the intervals between time-lapse image-shooting operations to be performed.

It is not desirable that the time of changing the settings of time-lapse image shooting and the time of controlling the microscope during the intervals between time-lapse image-shooting operations have an overlap therebetween. Thus, using, for example, the table T4 depicted in FIG. 19, the access control unit 45 may perform exclusive control for the changing of the settings of time-lapse image-shooting operations and the controlling of the microscope during the intervals between the time-lapse image-shooting operations. In particular, the access control unit 45 sets an exclusion flag in the table T4 before performing the changing of the settings of time-lapse image-shooting operations or the controlling of the microscope during the intervals between the time-lapse image-shooting operations. In addition, the access control unit 45 removes the exclusion flag from the table T4 after the changing of the settings of time-lapse image-shooting operations or the controlling of the microscope during the intervals between the time-lapse image-shooting operations is finished. Accordingly, the time of the changing of the settings of time-lapse image-shooting operations and the time of the controlling of the microscope during the intervals between time-lapse image-shooting operations can be prevented from having an overlap therebetween. Performing the exclusive control on a microscope-by-microscope basis will be sufficiently effective. Thus, for each microscope, the table T4 will desirably have a region therein, as depicted in FIG. 19.

Fifth Embodiment

Figure 21:
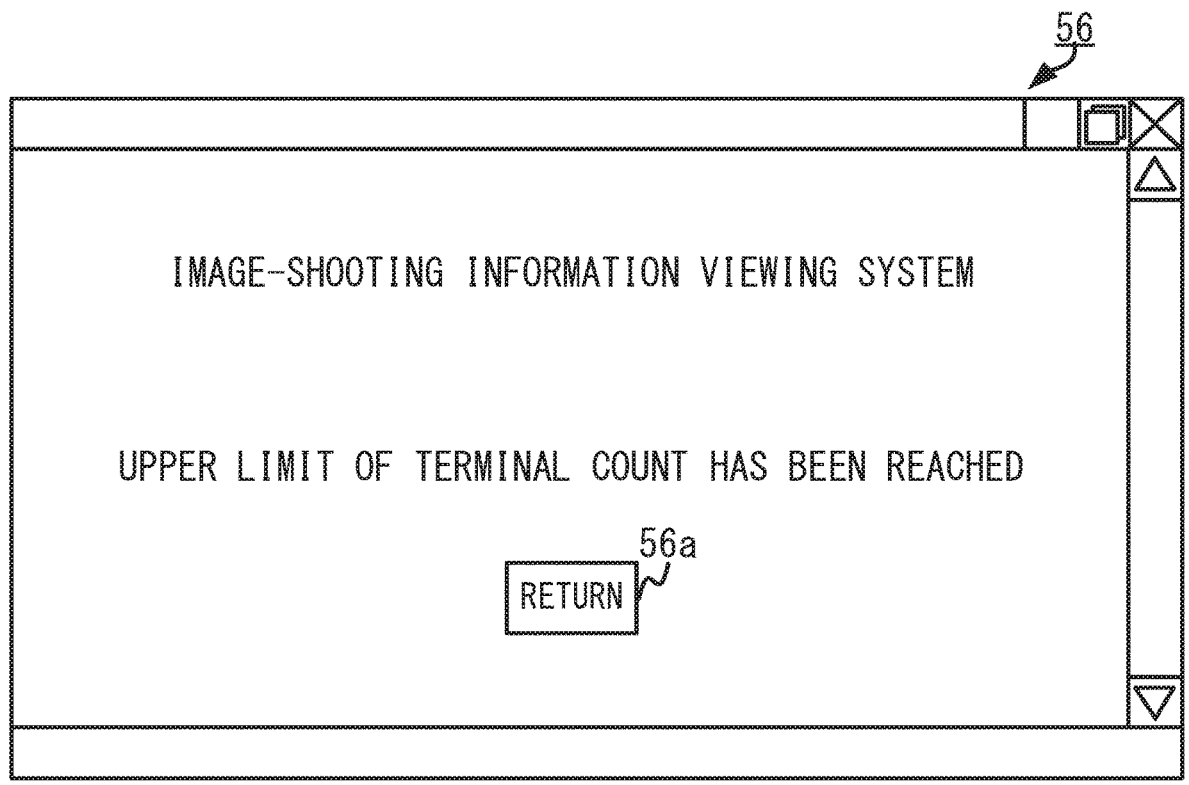
FIG. 21 exemplifies an error screen.

FIG. 20 is a flowchart of an access control process performed by the control apparatus 40 in accordance with the present embodiment. FIG. 21 exemplifies the error screen.

The microscope system in accordance with the present embodiment is different from the microscope system 1 in that the control apparatus 40 of the former performs an access control process depicted in FIG. 20 instead of the access control process depicted in FIG. 8. Otherwise, the microscope system in accordance with the present embodiment is similar to the microscope system 1. The microscope system in accordance with the present embodiment will hereinafter be simply referred to as a microscope system.

The control apparatus 40 starts the access control process depicted in FIG. 20 upon receipt of such a request from the communication terminal 100. The processes of steps S51-S53 are similar to those of steps S44-S46 depicted in FIG. 16.

The control apparatus 40 assesses the validity of access (step S54). In this example, the access control unit 45 assesses the validity of the access on the basis of a result of comparison between input information and the details of the access codes stored in the storage unit 44 and a result of comparison between the terminal identification information acquired in step S53 and terminal identification information registered in advance.

When it is determined that the access is valid (YES in step S55), the control apparatus 40 refers to an access terminal list (step S56). For example, the access terminal list may be a list indicating, for each access code, terminal information of terminals that accessed the microscope system in the past. In this example, by referring to the access terminal list, the access control unit 45 counts the number of pieces of terminal identification information recorded in the access terminal list and determines whether the terminal identification information acquired in step S53 has been recorded.

The control apparatus 40 determines whether the number of terminals is equal to or less than an upper limit (step S57). In this example, the access control unit 45 determines whether, even when the terminal identification information acquired in step S53 has been added, the number of pieces of terminal identification information recorded in the access terminal list is equal to or less than a terminal-count upper limit determined in advance. Thus, when determining in step S56 that the terminal identification information acquired in step S53 has been recorded in the access terminal list, the access control unit 45 determines that the terminal-count upper limit has not been exceeded. Even when the terminal identification information acquired in step S53 has not been recorded in the access terminal list, as long as the number counted in step S56 is less than the terminal-count upper limit, the access control unit 45 determines that the terminal-count upper limit has not been exceeded. When the terminal identification information acquired in step S53 has been recorded in the access terminal list and the number counted in step S56 has reached the terminal-count upper limit, the access control unit 45 determines that the terminal-count upper limit has been exceeded.

When determining that the number of terminals is equal to or less than the terminal-count upper limit (YES in step S57), the control apparatus 40 causes the communication terminal 100 to display the image-shooting-information display screen (step S58). The process of step S58 is similar to that of step S15 depicted in FIG. 8.

When determining that the number of terminals is not equal to or less than the terminal-count upper limit (NO in step S57), the control apparatus 40 causes the communication terminal 100 to display the error screen (step S59). In this case, for example, the access control unit 45 may create and transmit the screen 56 depicted in FIG. 21 to the communication terminal 100. Then, the communication terminal 100 may display the screen 56.

When determining that the access is not valid (NO in step S55), the control apparatus 40 causes the communication terminal 100 to display the error screen (step S60). The process of step S60 is similar to that of step S16 depicted in FIG. 8.

As with the microscope system 1, the microscope system in accordance with the present embodiment can allow the user to access image-shooting information such as a microscopic image over a network while ensuring sufficient security without loss of the convenience of the system. The number of terminals that can concurrently access the microscope system may be limited. Accordingly, the microscope system in accordance with the present embodiment can avoid a situation in which the control apparatus 40 is prevented from being operated normally due to numeral terminals accessing the microscope system 1, resulting in hindrance to normal operations of time-lapse image shooting.

An example in which identification information of terminals that accessed the microscope system in the past is recorded has been indicated above as an example of the method used by the access control unit 45 to perform load control on the basis of the number of communication terminals that request permission to access image-shooting information. However, the method of performing load control is not limited to this example. An upper limit may be set for the number of concurrent accesses to the microscope system. For example, another method, such as one that includes counting the number of sessions, may be used to avoid excessive load growth.

Sixth Embodiment

Figure 22:
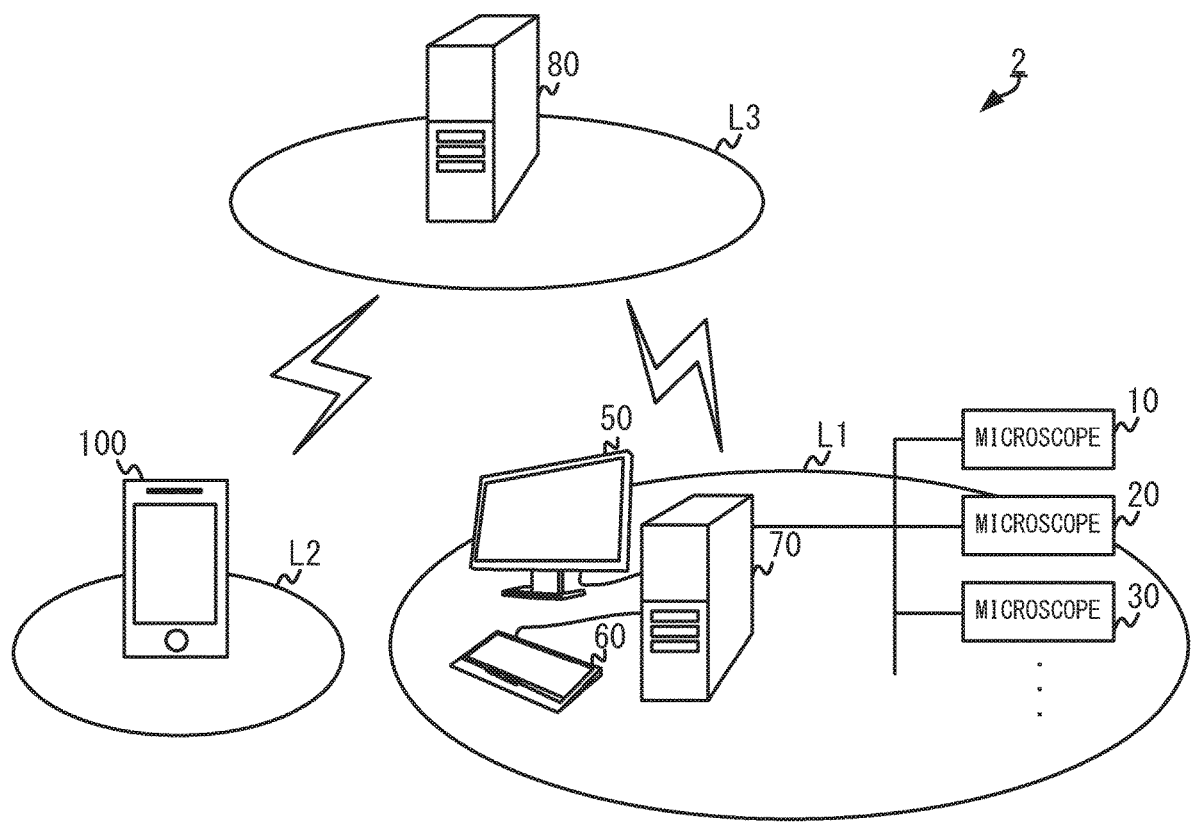
FIG. 22 exemplifies the configuration of a microscope system 2 in accordance with a sixth embodiment.
Figure 24:
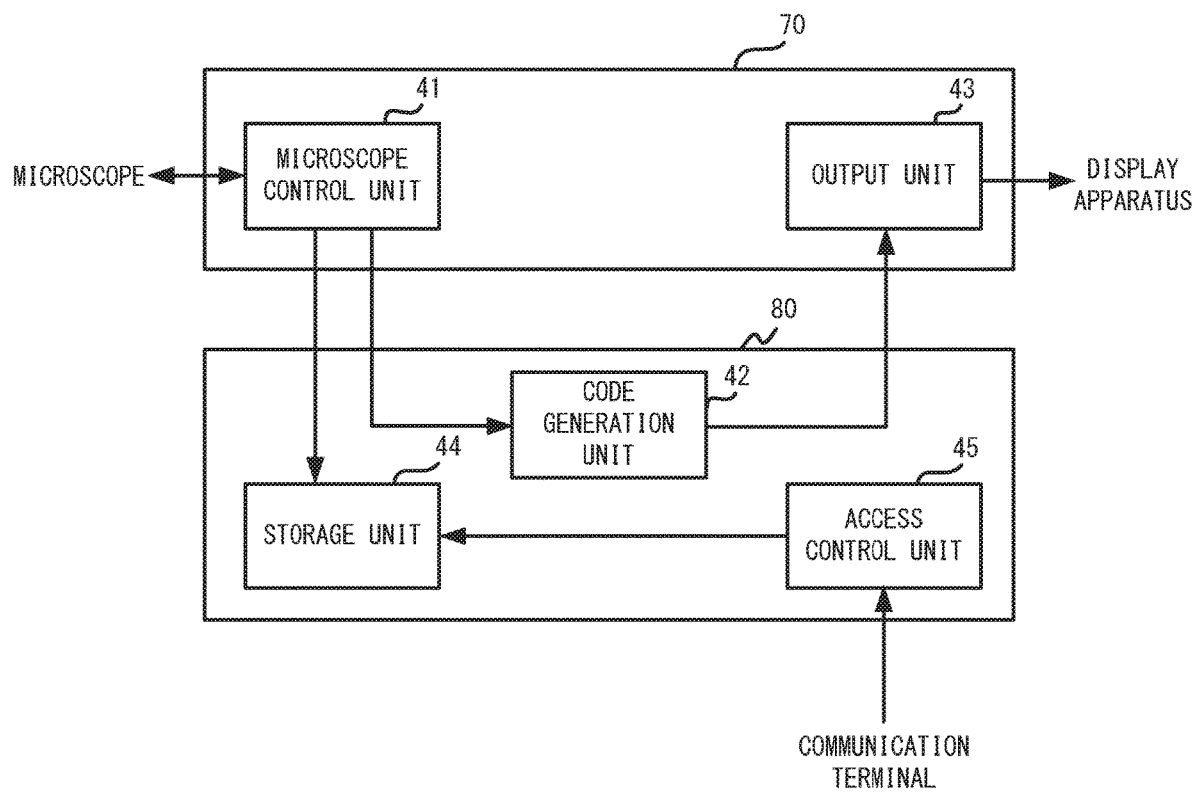
FIG. 24 illustrates another example of the functional configuration of a control apparatus 70 and a second control apparatus 80 in accordance with a sixth embodiment.

FIG. 22 exemplifies the configuration of a microscope system 2 in accordance with the present embodiment. FIGS. 23 and 24 each exemplify the functional configuration of a control apparatus 70 and a second control apparatus 80 in accordance with the present embodiment.

The microscope system 2 depicted in FIG. 22 is different from the microscope system 1 in that the former includes the control apparatus 70 and the second control apparatus 80, in place of the control apparatus 40. The hardware configurations of the control apparatus 70 and the second control apparatus 80 are not particularly limited but may be similar to, for example, the hardware configuration of the control apparatus 40 depicted in FIG. 4.

The apparatuses that constitute the microscope system 2 may be distributed among a plurality of positions. For example, the second control apparatus 80, which has portions of the function of the control apparatus 40, may be located at a position different from the position of the control apparatus 70, which also has portions of the function of the control apparatus 40. FIG. 22 depicts an example in which the control apparatus 70 is located in a site L1 while the second control apparatus 80 is located in a site L3, not the site L1. For example, the site L3 may be in a cloud environment to which a connection from the site L1 can be established via the Internet, and the second control apparatus 80 may be constructed on this cloud environment.

In the example depicted in FIG. 23, the control apparatus 70 includes a microscope control unit 41, a code generation unit 42, and an output unit 43, and the second control apparatus 80 includes a storage unit 44 and an access control unit 45. This configuration allows the site L1 to be prevented from being directly accessed by the communication terminal 100.

In the example depicted in FIG. 24, the control apparatus 70 includes a microscope control unit 41 and an output unit 43, and the second control apparatus 80 includes a code generation unit 42, a storage unit 44, and an access control unit 45. This configuration allows the load on the control apparatus 70 that controls a microscope to be reduced. In addition, the microscope system 2 can be constructed without making a major change to an existing microscope system. For example, the microscope system 2 may be constructed by simply adding the second control apparatus 80 to an existing microscope system and defining the input and output between the existing microscope system and the second control apparatus 80.

The embodiments described above indicate specific examples to facilitate understanding of the invention, and the present invention is not limited to these embodiments. Some of the embodiments described above may be applied to other embodiments so as to provide still other embodiments of the invention. Various modifications or changes can be made to the microscope system, the access-control assistance method, and the program without departing from the recitation in the claims.

Although the described embodiments are directed to examples in which time-lapse image shooting is performed, the described system may be any system that performs a series of image-shooting operations for acquiring a plurality of microscopic images. For example, besides time-lapse image-shooting operations, the series of image-shooting operations may be image-shooting operations for acquiring a plurality of images while changing regions to be observed in a direction orthogonal to the optical axis of an objective so as to construct a virtual slide image. Alternatively, the series of image-shooting operations may be image-shooting operations for acquiring a plurality of images while moving the focus in the optical-axis direction of the objective so as to construct a three-dimensional image. In addition, the series of image-shooting operations may be a combination of image-shooting operations for acquiring a plurality of images while changing regions to be observed and image-shooting operations for acquiring a plurality of images while moving the focus in the optical-axis direction. Moreover, the series of image-shooting operations may be a combination of at least either of the above-described two types of image-shooting operations and time-lapse image-shooting operations.

Although the described embodiments are directed to examples in which the storage unit 44 stores image-shooting information, the storage unit 44 may record information on the history of access from a communication terminal. The access history may be recorded under a distributed ledger technology such as block chain technology.

For example, the site L1 in the invention herein may be a task space (e.g., laboratory) in which a user performs some tasks. For example, the user may prepare, in the laboratory, a sample to be observed and set this sample on a microscope within the laboratory. When the user gives an instruction to start image shooting with the microscope by using a control apparatus within the laboratory, the code generation unit of the control apparatus will generate an access code. The generated access code is displayed on a display apparatus within the laboratory, and the user obtains the displayed access code within the laboratory. As a general rule, only limited persons can enter the laboratory. Hence, only persons who can enter the laboratory could obtain the displayed access code. Accordingly, the security is improved since the user obtains the access code within the laboratory.

What is claimed is:
1. A microscope system comprising:
a microscope that acquires a microscopic image; and
a hardware processor, wherein the hardware processor is configured to perform processes comprising:
causing the microscope to perform a series of image-shooting operations for acquiring a plurality of microscopic images;
outputting an access code generated in response to a start of the series of image-shooting operations, the access code being used to access image-shooting information pertaining to the series of image-shooting operations;
assessing a validity of access from a communication terminal to the image-shooting information based at least on input information transmitted from the communication terminal and one of the access code and details of the access code; and
determining, based at least on one of terminal identification information for specifying the communication terminal and user identification information for specifying a user of the communication terminal, whether to allow at least one of changing of settings of the series of image-shooting operations and controlling of the microscope during intervals in the series of image-shooting operations to be performed, wherein:

the hardware processor is configured to perform the assessing process and the determining process before completion of the series of the image-shooting operations, the series of the image-shooting operations include at least time-lapse image-shooting operations, and in the determining, the at least one of the changing of the settings and the controlling of the microscope is allowed to be performed during at least one of intervals between the time-lapse image shooting operations.

2. The microscope system of claim 1, wherein the hardware processor is configured to perform a process of outputting the access code to a display apparatus.

3. The microscope system of claim 2, further comprising the display apparatus, the display apparatus being configured to display the access code output from the hardware processor.

4. The microscope system of claim 1, wherein the hardware processor is configured to perform a process of outputting the access code to a printing apparatus.

5. The microscope system of claim 4, further comprising the printing apparatus, the printing apparatus being configured to print out the access code output from the hardware processor.

6. The microscope system of claim 1, wherein the hardware processor is configured to perform a process of outputting the access code to an e-mail server.

7. The microscope system of claim 1, wherein the hardware processor is configured to assess the validity of the access based on a result of a comparison between the input information and the one of the access code and the details of the access code.

8. The microscope system of claim 7, wherein the hardware processor is configured to transmit the image-shooting information to the communication terminal in response to determining that the access is valid.

9. The microscope system of claim 1, wherein the hardware processor is configured to asses the validity of the access based at least on (i) one of the terminal identification information for specifying the communication terminal and the user identification information for specifying the user of the communication terminal, and (ii) a result of a comparison between the input information and the one of the access code and the details of the access code.

10. The microscope system of claim 1, wherein the hardware processor is configured to perform exclusive control for the at least one of the changing of the settings and the controlling of the microscope.

11. The microscope system of claim 1, wherein the hardware processor is configured to perform load control based on a number of communication terminals that request permission to access the image-shooting information.

12. The microscope system of claim 1, wherein the hardware processor is configured to generate the access code in response to the start of the series of image-shooting operations, and to generate a different access code for each series of image-shooting operations.

13. The microscope system of claim 1, wherein:
the hardware processor is configured to generate the access code in response to the start of the series of image-shooting operations,
the microscope system includes a plurality of microscopes, and
the hardware processor is configured to generate a different access code for each of the plurality of microscopes.

14. The microscope system of claim 1, wherein the access code comprises a two-dimensional code.

15. The microscope system of claim 14, wherein details of the two-dimensional code comprise a URL of a web page.

16. The microscope system of claim 1, further comprising a storage that stores the plurality of microscopic images.

17. An access-control assistance method comprising performing, by using a control apparatus that controls a microscope:
causing the microscope to perform a series of image-shooting operations for acquiring a plurality of microscopic images;
outputting an access code generated in response to a start of the series of image-shooting operations, the access code being used to access image-shooting information pertaining to the series of image-shooting operations;
assessing a validity of access from a communication terminal to the image-shooting information based at least on input information transmitted from the communication terminal and one of the access code and details of the access code; and
determining, based at least on one of terminal identification information for specifying the communication terminal and user identification information for specifying a user of the communication terminal, whether to allow at least one of changing of settings of the series of image-shooting operations and controlling of the microscope during intervals in the series of image-shooting operations to be performed,
wherein:
the assessing and the determining are performed before completion of the series of the image-shooting operations,
the series of the image-shooting operations include at least time-lapse image-shooting operations, and
in the determining, the at least one of the changing of the settings and the controlling of the microscope is allowed to be performed during at least one of intervals between the time-lapse image-shooting operations.

18. A non-transitory computer-readable medium having stored therein a program for causing a control apparatus that controls a microscope to perform processes comprising:
causing the microscope to perform a series of image-shooting operations for acquiring a plurality of microscopic images;
outputting an access code generated in response to a start of the series of image-shooting operations, the access code being used to access image-shooting information pertaining to the series of image-shooting operations;
assessing a validity of access from a communication terminal to the image-shooting information based at least on input information transmitted from the communication terminal and one of the access code and details of the access code; and
determining, based at least on one of terminal identification information for specifying the communication terminal and user identification information for specifying a user of the communication terminal, whether to allow at least one of changing of settings of the series of image-shooting operations and controlling of the microscope during intervals in the series of image-shooting operations to be performed,
wherein:
the assessing and the determining are performed before completion of the series of the image-shooting operations,
the series of the image-shooting operations include at least time-lapse image-shooting operations, and in the determining, the at least one of the changing of the settings and the controlling of the microscope is allowed to be performed during at least one of intervals between the time-lapse image-shooting operations.

* * * * *